US011071026B2

(12) United States Patent
Paladugu et al.

(10) Patent No.: US 11,071,026 B2
(45) Date of Patent: Jul. 20, 2021

(54) SOURCE CELL CONNECTION HANDLING DURING MAKE-BEFORE-BREAK HANDOVER

(71) Applicant: QUALCOMM Incorporated, San Diego, CA (US)

(72) Inventors: Karthika Paladugu, San Diego, CA (US); Ozcan Ozturk, San Diego, CA (US); Prasad Reddy Kadiri, San Diego, CA (US); Arvind Vardarajan Santhanam, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,809

(22) Filed: Feb. 27, 2020

(65) Prior Publication Data

US 2020/0314710 A1  Oct. 1, 2020

Related U.S. Application Data

(60) Provisional application No. 62/825,543, filed on Mar. 28, 2019.

(51) Int. Cl.
*H04W 36/00* (2009.01)
*H04W 36/08* (2009.01)
(Continued)

(52) U.S. Cl.
CPC ....... *H04W 36/0079* (2018.08); *H04W 36/08* (2013.01); *H04W 76/19* (2018.02); *H04W 76/27* (2018.02); *H04W 76/30* (2018.02)

(58) Field of Classification Search
None
See application file for complete search history.

(56) References Cited

U.S. PATENT DOCUMENTS

2009/0191874 A1*  7/2009  Du ................... H04W 36/18
                                              455/436
2012/0088516 A1*  4/2012  Ji .................... H04W 24/02
                                              455/452.1
(Continued)

OTHER PUBLICATIONS

International Search Report and Written Opinion—PCT/US2020/020492—ISA/EPO—dated Sep. 22, 2010.

(Continued)

*Primary Examiner* — Hassan A Phillips
*Assistant Examiner* — Gautam Sharma
(74) *Attorney, Agent, or Firm* — Holland & Hart LLP/Qualcomm

(57) ABSTRACT

Methods, systems, and devices for wireless communications are described. Aspects include a UE communicating, with a first base station while in a connected state with a first cell served by the first base station, information associated with a configuration for the connected state via a signaling radio bearer and application via a data radio bearer. The UE may receive, while in the connected state with the first cell, a handover command from the first base station indicating a handover to a second cell served by a second base station. Aspects may include the UE initiating a connection procedure with the second cell while the connected state with the first cell. The UE may suspend the signal radio bearer and maintain the data radio bearer during the connection procedure with the second cell.

28 Claims, 19 Drawing Sheets

(51) Int. Cl.
*H04W 76/27* (2018.01)
*H04W 76/19* (2018.01)
*H04W 76/30* (2018.01)

(56) References Cited

U.S. PATENT DOCUMENTS

| | | | | |
|---|---|---|---|---|
| 2014/0198768 A1* | 7/2014 | Hahn | ................ | H04W 36/0061 370/331 |
| 2014/0211757 A1* | 7/2014 | Pereira | ................ | H04W 36/125 370/331 |
| 2015/0063091 A1* | 3/2015 | Vesterinen | .............. | H04W 8/02 370/216 |
| 2015/0173011 A1* | 6/2015 | Das | ...................... | H04W 24/02 370/328 |
| 2016/0278119 A1* | 9/2016 | Nammi | ............... | H04W 74/002 |
| 2018/0227805 A1* | 8/2018 | Jang | .................. | H04W 28/0268 |
| 2018/0352481 A1* | 12/2018 | Taguchi | ............ | H04W 36/0011 |
| 2019/0320355 A1* | 10/2019 | Da Silva | ............. | H04W 72/046 |

OTHER PUBLICATIONS

Mediatek Inc: "Mobility Failure Recovery in NR", 3GPP Draft, 3GPP TSG-RAN WG2 Meeting #105, R2-1900162 Mobility Failure Recovery in NR, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051601562, 6 Pages, Retrieved from the Internet: URL: http://www.3gpp.org/ftp/tsg%5Fran/WG2%5FRL2/TSGR2%5F105/Docs/R2%2D1900162%2Ezip, [retrieved on Feb. 15, 2019], Section 2.

Partial International Search Report—PCT/US2020/020492—ISAEPO—Feb. 28, 2020.

Qualcomm Incorporated: "Control Plane Handling and Procedures to Support Make-Before-Break (MBB) HO", 3GPP Draft, 3GPP TSG-RAN WG2 Meeting #105, R2-1900358, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019—Mar. 1, 2019, Feb. 15, 2019 (Feb 15, 2019), XP051601754, 4 Pages, Retrieved from the Internet: URL: http://www.3gpp.org/ftp/tsg%5Fran/WG2%5FRL2/TSGR2%5F105/Docs/R2%2D1900358%2Ezip, [retrieved on Feb. 15, 2019], Section 2, figure 1.

Qualcomm Incorporated: "Control Plane Handling and Procedures to Support Make-Before-Break (MBB) HO", 3GPP Draft, 3GPP TSG-RAN WG2 Meeting #105bis, R2-1903643, 3rd Generation Partnership Project (3GPP), Mobile Competence Centre, 650, Route Des Lucioles, F-06921 Sophia-Antipolis Cedex, France, vol. RAN WG2, No. Xi'an, China, Apr. 8, 2019- Apr. 12, 2019, Mar. 28, 2019 (Mar. 28, 2019), XP051692907, 5 pages, Retrieved from the Internet: URL: http://www.3gpp.org/ftp/tsg%5Fran/WG2%5FRL2/TSGR2%5F105bis/Docs/R2%2D1903643%2Ezip, [retrieved on Mar. 28, 2019], Section 2.

Qualcomm Incorporated: "User Plane Changes to Minimize the Mobility Interruption during Make-Before-Break (MBB) HO", 3GPP Draft, 3GPP TSG-RAN WG2 Meeting #105, R21900360, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019 (Feb. 15, 2019), XP051601756, 5 Pages, Retrieved from the Internet: URL: http://www.3gpp.org/ftp/tsg%5Fran/WG2%5FRL2/TSGR2%5F105/Docs/R2%2D1900360%2Ezip, [retrieved on Feb. 15, 2019], Section 2.

* cited by examiner

US 11,071,026 B2

SOURCE CELL CONNECTION HANDLING DURING MAKE-BEFORE-BREAK HANDOVER

CROSS REFERENCE

The present Application for Patent claims the benefit of U.S. Provisional Patent Application No. 62/825,543 by PALADUGU et al., entitled "SOURCE CELL CONNECTION HANDLING DURING MAKE-BEFORE-BREAK HANDOVER," filed Mar. 28, 2019, assigned to the assignee hereof, and expressly incorporated herein.

BACKGROUND

The following relates generally to wireless communications, and more specifically to source cell connection handling during make-before-break handover.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may undergo a handover procedure from a base station that the UE is currently connected with (e.g., a source base station) to a new base station (e.g., target base station). The handover procedure may be initiated by the source base station sending a handover command to the UE. In some cases, the UE may drop the connection with the source base station and initiate a random access procedure with the target base station. As such, the UE may experience service interruption, increased latency of signaling or data communications or the like during the handover procedure. Further, if the random access procedure is unsuccessful or there is a radio link failure, service interruption or latency may be increased. Alternatively, the UE may retain the connection with the source base station while initiating the random access procedure with the target base station, which may be called a make-before-break handover, a Dual Active Protocol Stack (DAPS) handover, etc. However, make-before-break handover presents challenges in handling the source cell connection during the handover.

SUMMARY

The described techniques relate to improved methods, systems, devices, and apparatuses that support source cell connection handling during make-before-break handover. Generally, the described techniques provide for handling a source connection (e.g., radio resource control (RRC), signaling radio bearers (SRBs), data radio bearers (DRBs), radio resource management (RRM), paging messages, or the like) with a source cell while a UE is performing a handover procedure with a target cell. A UE may receive a handover command from a source base station serving the source cell indicating that the UE is to perform a handover procedure with a target cell served by a target base station. The UE may initiate a connection procedure (e.g., handover procedure) with the target cell, for example, by initiating a random access procedure with the target cell. In response to receiving the handover command, the UE may suspend SRB communications with the source cell, which may include ignoring or discarding configuration messages (e.g., RRC signaling) received from the source cell while the UE is performing the handover procedure. In some cases, the UE may receive one or more configuration messages, but not update the configurations based on receiving the messages. Additionally, the UE may maintain the DRBs with the source cell during the handover procedure. In this regard, the UE may continue to receive data messages from the source cell while performing a connection procedure with the target cell.

In some cases, the described techniques include managing a carrier aggregation configuration with the source cell, while the UE is performing a connection procedure with the target cell. This may include managing both primary and second cells associated with the source cell. In some cases, the described techniques may also include managing a dual connectivity configuration for the handover procedure.

A method of wireless communications at a UE is described. The method may include communicating, with a first base station while in a connected state with a first cell served by the first base station, information associated with a configuration for the connected state via a signaling radio bearer and application data via a data radio bearer; receiving, while in the connected state with the first cell, a handover command from the first base station indicating a handover to a second cell served by a second base station; initiating, while in the connected state with the first cell, a connection procedure with the second cell; suspending, during the connection procedure with the second cell, the signaling radio bearer; and maintaining, during the connection procedure with the second cell, the data radio bearer.

An apparatus for wireless communications at a UE is described. The apparatus may include a processor, memory coupled with the processor, and instructions stored in the memory. The instructions may be executable by the processor to cause the apparatus to communicate, with a first base station while in a connected state with a first cell served by the first base station, information associated with a configuration for the connected state via a signaling radio bearer and application data via a data radio bearer; receive, while in the connected state with the first cell, a handover command from the first base station indicating a handover to a second cell served by a second base station; initiate, while in the connected state with the first cell, a connection procedure with the second cell; suspend, during the connection procedure with the second cell, the signaling radio bearer; and maintain, during the connection procedure with the second cell, the data radio bearer.

Another apparatus for wireless communications at a UE is described. The apparatus may include means for communicating, with a first base station while in a connected state with a first cell served by the first base station, information associated with a configuration for the connected state via a signaling radio bearer and application data via a data radio bearer; receiving, while in the connected state with the first cell, a handover command from the first base station indicating a handover to a second cell served by a second base station; initiating, while in the connected state with the first cell, a connection procedure with the second cell; suspending, during the connection procedure with the second cell, the signaling radio bearer; and maintaining, during the connection procedure with the second cell, the data radio bearer.

A non-transitory computer-readable medium storing code for wireless communications at a UE is described. The code may include instructions executable by a processor to communicate, with a first base station while in a connected state with a first cell served by the first base station, information associated with a configuration for the connected state via a signaling radio bearer and application data via a data radio bearer, receive, while in the connected state with the first cell, a handover command from the first base station indicating a handover to a second cell served by a second base station, initiate, while in the connected state with the first cell, a connection procedure with the second cell, suspend, during the connection procedure with the second cell, the signaling radio bearer, and maintain, during the connection procedure with the second cell, the data radio bearer.

In some examples of the method, apparatuses, and non-transitory computer-readable medium described herein, the suspending the signaling radio bearer may include operations, features, means, or instructions for receiving, during the connection procedure with the second cell, a configuration message via the signaling radio bearer associated with updating the configuration for the connected state, and suppressing the updating of the configuration based on the initiating of the connection procedure.

In some examples of the method, apparatuses, and non-transitory computer-readable medium described herein, the maintaining the data radio bearer may include operations, features, means, or instructions for communicating, during the connection procedure with the second cell, a data message associated with the application data via the data radio bearer.

Some examples of the method, apparatuses, and non-transitory computer-readable medium described herein may further include operations, features, means, or instructions for suspending the data radio bearer based on determining that the connection procedure with the second cell was successful.

Some examples of the method, apparatuses, and non-transitory computer-readable medium described herein may further include operations, features, means, or instructions for receiving an indication from the second cell to release the data radio bearer, and releasing the data radio bearer based on the indication.

Some examples of the method, apparatuses, and non-transitory computer-readable medium described herein may further include operations, features, means, or instructions for establishing, over the second cell, a second data radio bearer for communicating the application data with the second base station.

Some examples of the method, apparatuses, and non-transitory computer-readable medium described herein may further include operations, features, means, or instructions for resuming the data radio bearer based on determining that the connection procedure was unsuccessful or a radio link failure occurred for the second cell.

Some examples of the method, apparatuses, and non-transitory computer-readable medium described herein may further include operations, features, means, or instructions for receiving an indication from the second cell to release the signaling radio bearer, and releasing the signaling radio bearer based on the indication.

In some examples of the method, apparatuses, and non-transitory computer-readable medium described herein, the handover command includes a condition for initiating the connection procedure with the second cell, where the suspending the signaling radio bearer may be based on determining that the condition for initiating the connection procedure may be satisfied.

Some examples of the method, apparatuses, and non-transitory computer-readable medium described herein may further include operations, features, means, or instructions for resuming the signal radio bearer based on determining that the connection procedure was unsuccessful or a radio link failure occurred for the second cell.

Some examples of the method, apparatuses, and non-transitory computer-readable medium described herein may further include operations, features, means, or instructions for suspending monitoring for at least one paging message based on receiving the handover command.

Some examples of the method, apparatuses, and non-transitory computer-readable medium described herein may further include operations, features, means, or instructions for continuing a radio link monitoring procedure, a beam failure recovery procedure, or a combination thereof on the first cell during the connection procedure with the second cell.

Some examples of the method, apparatuses, and non-transitory computer-readable medium described herein may further include operations, features, means, or instructions for determining that a radio link failure may have occurred on the first cell during the connection procedure with the second cell, and suspending a connection re-establishment procedure.

Some examples of the method, apparatuses, and non-transitory computer-readable medium described herein may further include operations, features, means, or instructions for suspending, during the connection procedure with the second cell, a radio resource management procedure for the first cell.

In some examples of the method, apparatuses, and non-transitory computer-readable medium described herein, the suspending the radio resource management procedure may include operations, features, means, or instructions for suspending measurements for a measurement gap for the first cell, releasing the measurement gap for the first cell, suppressing monitoring for one or more radio resource management events, or a combination thereof.

A method of wireless communications at a base station is described. The method may include communicating, with a first UE, information associated with a configuration for a connected state for the UE via a signaling radio bearer and application data via a data radio bearer; transmitting a handover command to the UE indicating a handover to a second cell served by a second base station; suspending the signaling radio bearer based on transmitting the handover command; and maintaining the data radio bearer after transmitting the handover command.

An apparatus for wireless communications at a base station is described. The apparatus may include a processor, memory coupled with the processor, and instructions stored in the memory. The instructions may be executable by the processor to cause the apparatus to communicate, with a first UE, information associated with a configuration for a connected state for the UE via a signaling radio bearer and application data via a data radio bearer; transmit a handover command to the UE indicating a handover to a second cell served by a second base station; suspend the signaling radio bearer based on transmitting the handover command; and maintain the data radio bearer after transmitting the handover command.

Another apparatus for wireless communications at a base station is described. The apparatus may include means for communicating, with a first UE, information associated with a configuration for a connected state for the UE via a signaling radio bearer and application data via a data radio bearer; transmitting a handover command to the UE indicating a handover to a second cell served by a second base station; suspending the signaling radio bearer based on transmitting the handover command; and maintaining the data radio bearer after transmitting the handover command.

A non-transitory computer-readable medium storing code for wireless communications at a base station is described. The code may include instructions executable by a processor to communicate, with a first UE, information associated with a configuration for a connected state for the UE via a signaling radio bearer and application data via a data radio bearer; transmit a handover command to the UE indicating a handover to a second cell served by a second base station; suspend the signaling radio bearer based on transmitting the handover command; and maintain the data radio bearer after transmitting the handover command.

In some examples of the method, apparatuses, and non-transitory computer-readable medium described herein, the suspending the signaling radio bearer includes suppressing one or more configuration messages associated with updating the configuration for the connected state for the UE.

In some examples of the method, apparatuses, and non-transitory computer-readable medium described herein, the maintaining the data radio bearer may include operations, features, means, or instructions for communicating, to the UE, a data message associated with the application data via the data radio bearer after transmitting the handover command.

Some examples of the method, apparatuses, and non-transitory computer-readable medium described herein may further include operations, features, means, or instructions for receiving an indication that a connection procedure between the UE and the second cell was successful, and transmitting a release message to the UE to release the data radio bearer.

Some examples of the method, apparatuses, and non-transitory computer-readable medium described herein may further include operations, features, means, or instructions for receiving an indication that a connection procedure between the UE and the second cell was successful, suspending the data radio bearer based on receiving the indication, and resuming the data radio bearer based on determining that a radio link failure occurred between the UE and the second cell.

Some examples of the method, apparatuses, and non-transitory computer-readable medium described herein may further include operations, features, means, or instructions for receiving an indication that a connection procedure between the UE and the second cell was successful, and transmitting a release message to the UE to release the signaling radio bearer based on receiving the indication.

In some examples of the method, apparatuses, and non-transitory computer-readable medium described herein, the handover command includes a condition for initiating a connection procedure with the second cell.

Some examples of the method, apparatuses, and non-transitory computer-readable medium described herein may further include operations, features, means, or instructions for resuming the signaling radio bearer based on receiving an indication that a connection procedure between the UE and the second cell was unsuccessful or a radio link failure occurred between the UE and the second cell.

Some examples of the method, apparatuses, and non-transitory computer-readable medium described herein may further include operations, features, means, or instructions for suspending sending at least one paging message based on transmitting the handover command.

A method of wireless communications at a UE is described. The method may include communicating according to a carrier aggregation configuration, the carrier aggregation configuration including a first primary cell served by a first base station and at least one secondary cell served by the first base station, receiving a handover command from the first base station indicating a handover of the first primary cell to a second primary cell served by a second base station, initiating a connection procedure to the second primary cell while maintaining a connected state with the first primary cell, and determining a modification of the carrier aggregation configuration for the at least one secondary cell based on the receiving the handover command.

An apparatus for wireless communications at a UE is described. The apparatus may include a processor, memory coupled with the processor, and instructions stored in the memory. The instructions may be executable by the processor to cause the apparatus to communicate according to a carrier aggregation configuration, the carrier aggregation configuration including a first primary cell served by a first base station and at least one secondary cell served by the first base station; receive a handover command from the first base station indicating a handover of the first primary cell to a second primary cell served by a second base station; initiate a connection procedure to the second primary cell while maintaining a connected state with the first primary cell; and determine a modification of the carrier aggregation configuration for the at least one secondary cell based on the receiving the handover command.

Another apparatus for wireless communications at a UE is described. The apparatus may include means for communicating according to a carrier aggregation configuration, the carrier aggregation configuration including a first primary cell served by a first base station and at least one secondary cell served by the first base station; receiving a handover command from the first base station indicating a handover of the first primary cell to a second primary cell served by a second base station; initiating a connection procedure to the second primary cell while maintaining a connected state with the first primary cell; and determining a modification of the carrier aggregation configuration for the at least one secondary cell based on the receiving the handover command.

A non-transitory computer-readable medium storing code for wireless communications at a UE is described. The code may include instructions executable by a processor to communicate according to a carrier aggregation configuration, the carrier aggregation configuration including a first primary cell served by a first base station and at least one secondary cell served by the first base station; receive a handover command from the first base station indicating a handover of the first primary cell to a second primary cell served by a second base station; initiate a connection procedure to the second primary cell while maintaining a connected state with the first primary cell; and determine a modification of the carrier aggregation configuration for the at least one secondary cell based on the receiving the handover command.

In some examples of the method, apparatuses, and non-transitory computer-readable medium described herein, the modification may include operations, features, means, or instructions for releasing the at least one secondary cell served by the first base station from the carrier aggregation configuration.

In some examples of the method, apparatuses, and non-transitory computer-readable medium described herein, the modification may include operations, features, means, or instructions for deactivating the at least one secondary cell based on receiving the handover command from the first base station.

In some examples of the method, apparatuses, and non-transitory computer-readable medium described herein, the modification may include operations, features, means, or instructions for maintaining the at least one secondary cell in an activated state during a handover procedure with the second base station.

In some examples of the method, apparatuses, and non-transitory computer-readable medium described herein, the deactivating the at least one secondary cell includes suspending a radio resource monitoring procedure for the at least one secondary cell.

A method of wireless communications at a base station is described. The method may include configuring a UE according to a carrier aggregation configuration, the carrier aggregation configuration including a first primary cell served by the base station and at least one secondary cell served by the base station; communicating with the UE via the first primary cell and the at least one secondary cell; transmitting, to the UE, a handover command indicating a handover of communications from the first primary cell to a second primary cell served by a second base station; and determining a modification of the carrier aggregation configuration based on the transmitting the handover command.

An apparatus for wireless communications at a base station is described. The apparatus may include a processor, memory coupled with the processor, and instructions stored in the memory. The instructions may be executable by the processor to cause the apparatus to configure a UE according to a carrier aggregation configuration, the carrier aggregation configuration including a first primary cell served by the base station and at least one secondary cell served by the base station; communicate with the UE via the first primary cell and the at least one secondary cell; transmit, to the UE, a handover command indicating a handover of communications from the first primary cell to a second primary cell served by a second base station; and determine a modification of the carrier aggregation configuration based on the transmitting the handover command.

Another apparatus for wireless communications at a base station is described. The apparatus may include means for configuring a UE according to a carrier aggregation configuration, the carrier aggregation configuration including a first primary cell served by the base station and at least one secondary cell served by the base station; communicating with the UE via the first primary cell and the at least one secondary cell; transmitting, to the UE, a handover command indicating a handover of communications from the first primary cell to a second primary cell served by a second base station; and determining a modification of the carrier aggregation configuration based on the transmitting the handover command.

A non-transitory computer-readable medium storing code for wireless communications at a base station is described. The code may include instructions executable by a processor to configure a UE according to a carrier aggregation configuration, the carrier aggregation configuration including a first primary cell served by the base station and at least one secondary cell served by the base station; communicate with the UE via the first primary cell and the at least one secondary cell; transmit, to the UE, a handover command indicating a handover of communications from the first primary cell to a second primary cell served by a second base station; and determine a modification of the carrier aggregation configuration based on the transmitting the handover command.

In some examples of the method, apparatuses, and non-transitory computer-readable medium described herein, the modification may include operations, features, means, or instructions for releasing the at least one secondary cell from the carrier aggregation configuration.

In some examples of the method, apparatuses, and non-transitory computer-readable medium described herein, the modification may include operations, features, means, or instructions for deactivating the at least one secondary cell for the carrier aggregation configuration.

In some examples of the method, apparatuses, and non-transitory computer-readable medium described herein, the modification may include operations, features, means, or instructions for maintaining, for the carrier aggregation configuration, the at least one secondary cell in an activated state.

Some examples of the method, apparatuses, and non-transitory computer-readable medium described herein may further include operations, features, means, or instructions for receiving one or more capabilities of the UE, where the maintaining the at least one secondary cell in an activated state may be based on the one or more capabilities of the UE.

Some examples of the method, apparatuses, and non-transitory computer-readable medium described herein may further include operations, features, means, or instructions for communicating, with the second base station, at least one message for determining the carrier aggregation configuration.

A method of wireless communications is described. The method may include configuring a UE with a dual connectivity configuration including a master cell group associated with a first base station and a secondary cell group associated with a second base station, communicating with the UE via one or more bearers associated with one or more carriers of the master cell group or the secondary cell group, determining to handover one of the master cell group or the secondary cell group to a third base station, and transferring the one or more bearers to the other of the master cell group or the secondary cell group prior to releasing the one of the master cell group or the secondary cell group from the dual connectivity configuration.

An apparatus for wireless communications is described. The apparatus may include a processor, memory coupled with the processor, and instructions stored in the memory. The instructions may be executable by the processor to cause the apparatus to configure a UE with a dual connectivity configuration including a master cell group associated with a first base station and a secondary cell group associated with a second base station, communicate with the UE via one or more bearers associated with one or more carriers of the master cell group or the secondary cell group, determine to handover one of the master cell group or the secondary cell group to a third base station, and transfer the one or more bearers to the other of the master cell group or the secondary cell group prior to releasing the one of the master cell group or the secondary cell group from the dual connectivity configuration.

Another apparatus for wireless communications is described. The apparatus may include means for configuring a UE with a dual connectivity configuration including a master cell group associated with a first base station and a secondary cell group associated with a second base station, communicating with the UE via one or more bearers associated with one or more carriers of the master cell group or the secondary cell group, determining to handover one of the master cell group or the secondary cell group to a third base station, and transferring the one or more bearers to the other of the master cell group or the secondary cell group prior to releasing the one of the master cell group or the secondary cell group from the dual connectivity configuration.

A non-transitory computer-readable medium storing code for wireless communications is described. The code may include instructions executable by a processor to configure a UE with a dual connectivity configuration including a master cell group associated with a first base station and a secondary cell group associated with a second base station, communicate with the UE via one or more bearers associated with one or more carriers of the master cell group or the secondary cell group, determine to handover one of the master cell group or the secondary cell group to a third base station, and transfer the one or more bearers to the other of the master cell group or the secondary cell group prior to releasing the one of the master cell group or the secondary cell group from the dual connectivity configuration.

In some examples of the method, apparatuses, and non-transitory computer-readable medium described herein, the dual connectivity configuration may include operations, features, means, or instructions for releasing the first set of secondary cells or the second set of secondary cells based on determining to handover the master cell group or the secondary cell group.

Some examples of the method, apparatuses, and non-transitory computer-readable medium described herein may further include operations, features, means, or instructions for determining to handover the other of the master cell group or the secondary cell group to a fourth base station, and transferring one or more additional bearers from the other of the master cell group or the secondary cell group to a cell group served by the third base station prior to releasing the other of the master cell group or the secondary cell group from the dual connectivity configuration.

DETAILED DESCRIPTION

Figure 1:
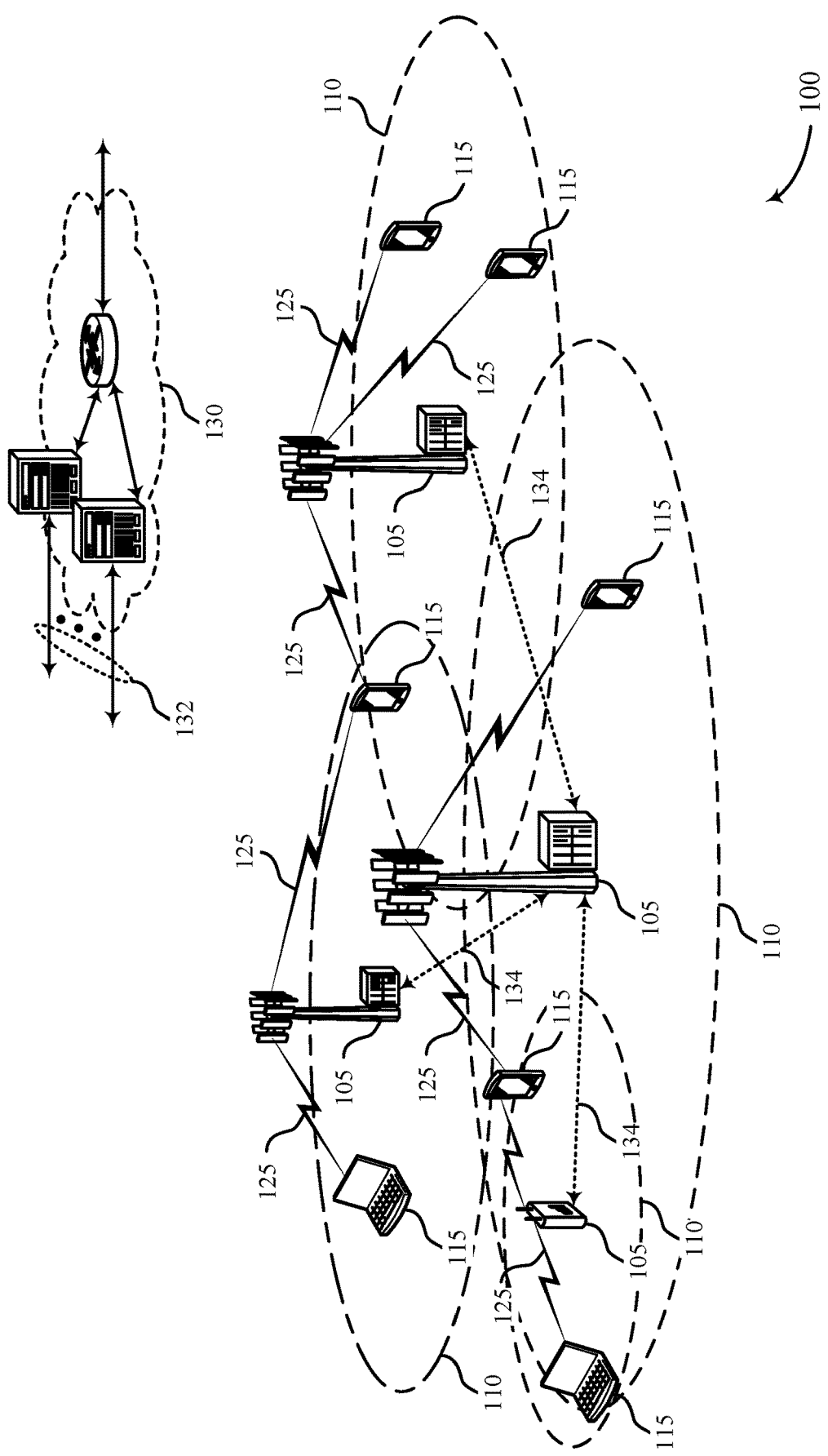
FIG. 1 illustrates an example of a system for wireless communications that supports source cell connection handling during make-before-break handover in accordance with aspects of the present disclosure.

A UE may undergo a handover procedure from a source cell to a target cell. During the handover procedure the UE may release or drop a connection with the source cell to establish a new connection with the target cell. As a result, the UE may experience service interruption or an increased latency of signaling or data communications during the handover procedure. Further, if the random access procedure is unsuccessful or there is a radio link failure, service interruption or latency may be increased. In some cases, the UE may maintain a connection with the source cell while attempting to connect to the target cell, which may be called make-before-break handover or Dual Active Protocol Stack (DAPS) handover. However, the UE must determine how to handle the source cell connection during the make-before-break handover, which may include determining how to handle configuration information, data transmissions, paging, resource management procedures, or the like.

In some aspects, the UE may retain a connection with the source base station by configuring communications over one or more signal radio bearers (SRBs) and one or more data radio bearers (DRBs) while initiating a connection with the target base station. For example, the UE may receive SRB messages, but suspend one or more SRBs during the connection procedure with the target cell. This may include the UE ignoring, discarding, or not processing messages received from the source base station via one or more SRBs. In some cases, the UE may not update a configuration during the connection procedure with the target cell. For example, if the UE receives one or more configurations from the source base station, the UE may suppress updating the configuration. Further, the UE may receive and process data from the source base station via one or DRBs during the connection procedure with the target base station. In this regard, the UE may continue to receive application data while initiating a connection with the target base station.

In some cases, the UE and source base station may manage one or more carrier aggregation configurations during the connection procedure with the target cell. For example, the UE may release one or more secondary cells associated with the source base station upon receiving a handover command or initiating a communication connection with the target base station. Examples also include the UE deactivating one or more secondary cells during the connection procedure or maintaining the secondary cells in the activated state. In some cases, a dual connectivity configuration may also be managed.

Aspects of the disclosure are initially described in the context of a wireless communications system. Aspects of the disclosure are then described in the context of process flow diagrams and a wireless communication system. Aspects of the disclosure are further illustrated by and described with reference to apparatus diagrams, system diagrams, and flowcharts that relate to source cell connection handling during make-before-break handover.

FIG. 1 illustrates an example of a wireless communications system 100 that supports source cell connection handling during make-before-break handover in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may perform handover procedures between a UE 115, a source cell served by a source base station 105, and a target cell served by a target base station 105. A UE 115 may be connected to a source cell and communicating with the source cell. For example, the UE 115 may communicate configuration information over one or more signal radio bearers (SRBs) and application data over one or more data radio bearers (DRBs). In some cases, a source base station 105 may determine to initiate a handover procedure at a UE 115, for example, based on signal quality measurement received at the source base station 105 from the UE 115. The source base station 105 may send a handover command to the UE 115 indicating that the UE 115 is to perform a handover procedure (e.g., connection procedure) with a target cell served by a target base station 105. The UE 115 may initiate a connection procedure with the target cell while maintaining a connected state with a source cell (e.g., make-before-break handover, which may also be referred to as DAPS handover).

In some cases, a UE 115, during a connection procedure with a target cell, may suspend communications over an SRB with the source cell. For example, the UE 115 may ignore or discard configuration messages (e.g., RRC signaling) from the source cell or not update one or more configuration parameters at the UE 115 based on configuration messages received from the source cell. Additionally or alternatively, the UE may maintain one or more DRBs with the source cell during the connection procedure with the target cell. This may include the UE communicating downlink and uplink data messages (e.g., associated with application data) with the source cell during the connection procedure with the target cell.

Figure 2:
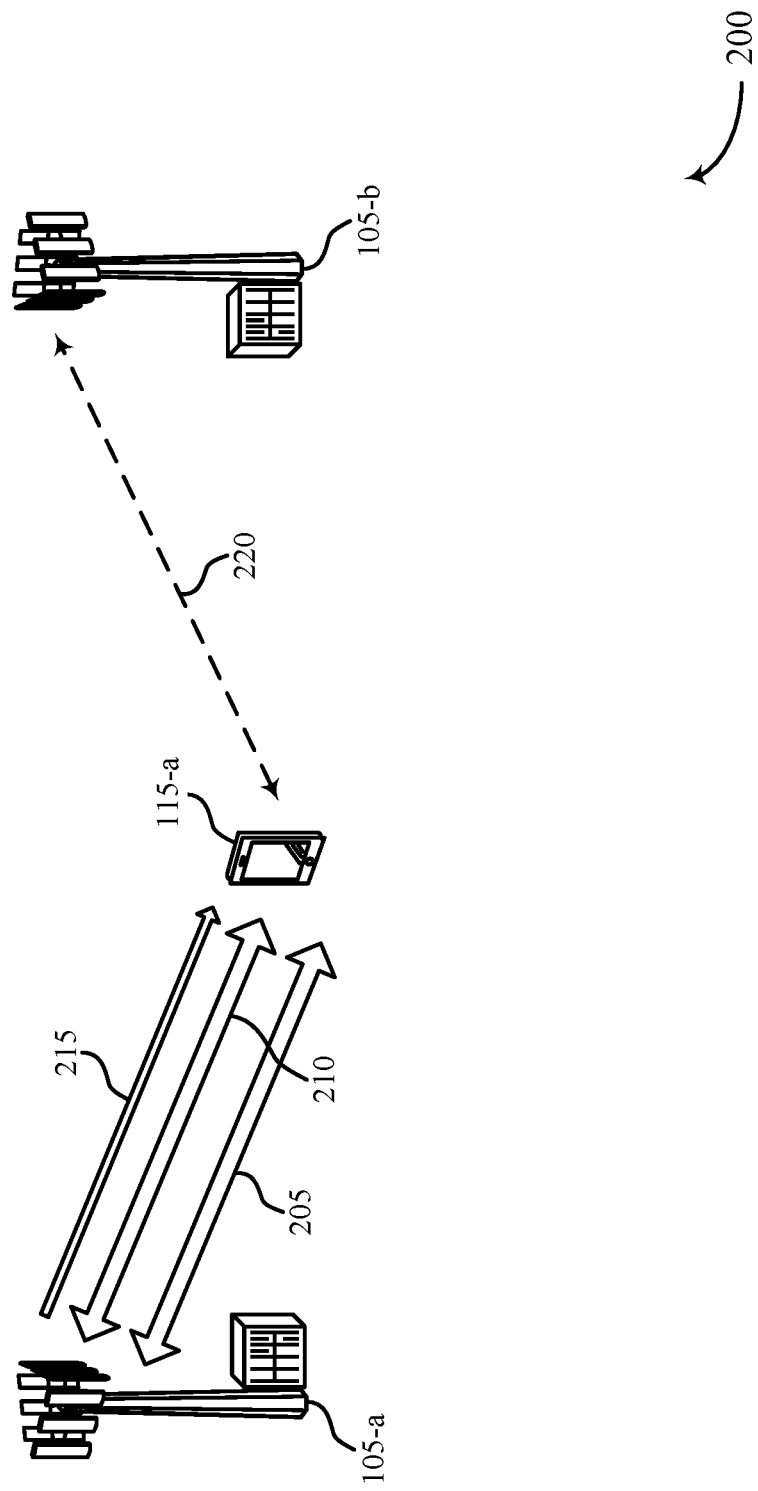
FIG. 2 illustrates an example of a system for wireless communication that supports source cell connection handling during make-before-break handover in accordance with aspects of the present disclosure.

FIG. 2 illustrates an example of a wireless communication system 200 that supports source cell connection handling during make-before-break handover in accordance with aspects of the present disclosure. In some examples, the wireless communication system 200 may implement aspects of wireless communication system 100. The wireless communication system 200 may include a source base station 105-a and a target base station 105-b, which may be examples of a base station 105 described with reference to FIG. 1; and a UE 115-a, which may be an example of a UE 115 described with reference to FIG. 1. The wireless communication system 200 illustrates an example of a handover procedure where a communication connection between the UE 115-a and the source cell served by the source base station 105-a (e.g., first base station) is maintained while the UE 115-a is performing a connection procedure with a target base station 105-b (e.g., second base station).

The UE 115-a and the source base station 105-a may be in a connected state and may be exchanging information over a communication connection. In some cases, the communication connection may include one or more SRBs 205, which may carry configuration information (e.g., RRC signaling) and one or more DRBs 210, which may carry data, such as application data. The source base station 105-a may determine that the UE 115-a is to perform a handover procedure to the second or target base station 105-b. In some cases, the source base station 105-a may make this determination based on signaling received from the UE 115-a, for example, based on one or more signal measurements associated with a target cell served by the target base station 105-b. The source base station 105-a may send a handover command 215 to the UE 115-a indicating that the UE 115-a is to initiate a handover procedure with the target base station 105-b.

In some cases, the source base station 105-a may indicate to the UE 115-a that the UE 115-a is to perform a conditional handover procedure. For example, the source base station 105-a may indicate that the UE 115-a should initiate a connection procedure with the target base station 105-b once a condition (e.g., RRM threshold) is met. In this regard, the UE may monitor one or more quality metrics associated with the target cell and initiate a connection procedure with the target base station 105-b if a condition specified by the source base station 105-a is satisfied.

In response to receiving the handover command, the UE 115-a may initiate a connection procedure 220 with the target base station 105-b. In some cases, the connection procedure 220 may include a random access procedure to establish a communication connection with the target base station 105-b. In other cases, the connection procedure 220 may include a non-random access handover procedure (e.g., RACH-less connection procedure) with the target base station 105-b.

In some cases, the UE 115-a may maintain a communication connection (e.g., SRBs 205 and DRBs 210) with the source base station 105-a while establishing an access connection with the target base station 105-b. In some cases, information exchanged over the SRBs 205 and DRBs 210 while the connection procedure 220 is configured between the UE 115-a and the target base station 105-b may depend on one or more capabilities of the UE 115-a. For example, the UE 115-a may indicate one or more capabilities to the source base station 105-a and the source base station 105-a may use the capabilities to configure communications between the UE 115-a and the source base station 105-a during the connection procedure with the target base station 105-b. For example, the UE 115-a may only receive and process data communications such as application data over one or more DRBs 210 with the base station, and may suppress communications over one or more SRBs 205. In some examples, the base station 105-a may transmit configuration information to the UE 115-a over one or more SRBs 205 and the UE 115-b may ignore, discard, not process, or otherwise not update a configuration at the UE 115-a during the connection procedure with the target cell. In other examples, the base station 105-a may stop sending configuration information to the UE 115-a over the one or more SRBs 205 upon transmitting the handover command.

In some cases, maintaining a communication connection may include the UE 115-a remaining in a connected state with a base station (e.g., source base station 105-a). For example, the UE 115-a and source base station 105-a may maintain one or more DRBs and transmit data (e.g., application data) via the one or more DRBs. Maintaining the one or more DRBs may also include maintaining the configuration context for supporting messaging via the one or more DRBs.

In some examples, the source base station 105-a may configure the UE 115-a in a carrier aggregation mode as part of a communication connection. That is, UE 115-a may be configured to communicate information over a primary cell and one or more secondary cells served by the source base station 105-a or other base stations. In this regard, management of communications over both primary and secondary cells for the source base station may be configured during a handover procedure between the UE 115-a and the target base station 105-b. In some cases, the management of carrier aggregation parameters during a handover procedure may be based on one or more capabilities of the UE 115-a.

Figure 3:
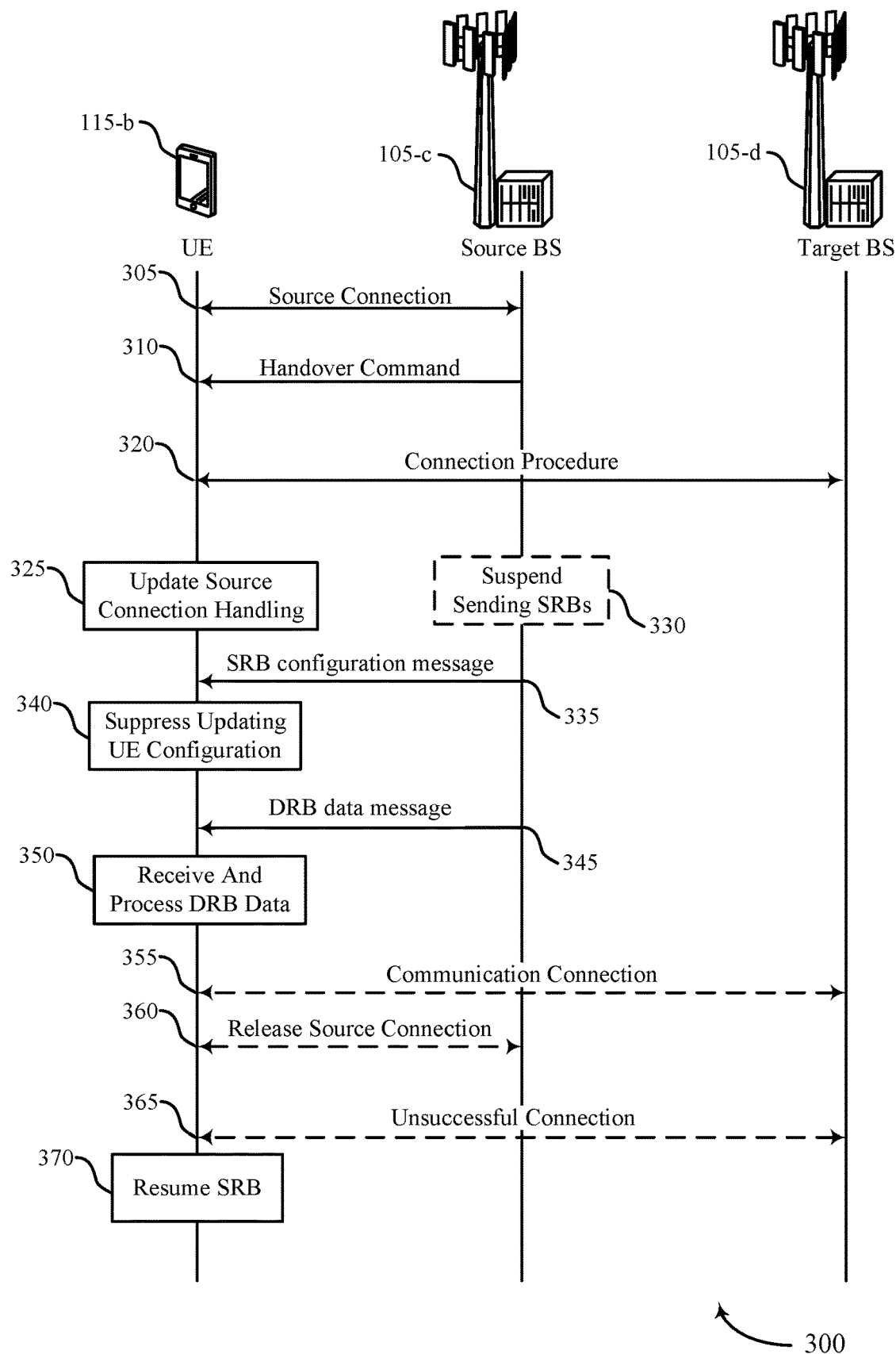
FIG. 3 illustrates an example of a process flow that supports source cell connection handling during make-before-break handover in accordance with aspects of the present disclosure.

FIG. 3 illustrates an example of a process flow 300 that supports source cell connection handling during make-before-break handover in accordance with aspects of the present disclosure. In some examples, the process flow 300 may implement aspects of wireless communication systems 100 or 200 described with reference to FIGS. 1 and 2. The process flow includes a UE 115-b, which may be an example of UEs 115 and 115-a described with reference to FIGS. 1 and 2; and base stations 105-c (e.g., source base station) and 105-d (e.g., target base station), which may be examples of base stations 105, 105-a, or 105-b described with reference to FIGS. 1 and 2. The process flow 300 includes functions and communications implemented by UE 115-b and base stations 105-c and 105-d in the context of handover procedures of the UE 115-b between the source base station 105-c and the target base station 105-d.

At 305, the UE 115-b may communicate with a first (e.g., source) cell served by the source base station 105-c over a source connection, which may include one or more SRBs and one or more DRBs. For example, the UE 115-b may transition from an idle state to a connected state with the source cell. In some cases, a communication protocol may be associated with a set of states, where each state may be associated with types of information available or resources monitored by the UE 115-b, a type of mobility control, and other operations. For example, a communication protocol (e.g., LTE, LTE-A, LTE-A Pro) may be associated with an idle state and a connected state. In the idle state, the UE 115-b may monitor a limited set of messages such as paging messages, may not have a configured timing advance, may not have configured SRBs or DRBs, and may perform UE-controlled mobility. In the connected state, the UE 115-b may monitor configuration information (e.g., RRC messages), have a timing advance, monitor a PDCCH, have configured SRBs or DRBs, have networked controlled mobility, or the like. To transition from the idle state to the connected state, the UE 115-b may perform a connection procedure (e.g., random access procedure). Some communication protocols (e.g., NR) may have additional states, such as an inactive state, which may be entered from the connected state and which may operate similarly to the idle state (e.g., UE-controlled mobility, monitoring of limited messaging), while still maintaining properties of an RRC connection set up during the connected state (e.g., maintaining information related to SRBs and DRBs but without communicating messages via the maintained SRBs and DRBs).

In some cases, the UE 115-b and the source base station 105-c may communicate configuration information, such as RRC signaling, via one or more SRBs over the source connection. The UE 115-b and base station 105-c may also communicate data, such as application data, via one or more DRBs over the source connection. In some examples, communication over the source connection may also include short messages or paging messages (e.g., signal information updates, public warning systems, or the like), radio link monitoring (RLM), beam failure recovery (BFR), radio resource management (RRM) or the like. An RLM process may include, for example, measuring and reporting of channel state information (CSI) for the serving cell.

At 310, the source base station 105-c may transmit a handover command to the UE 115-b. The handover command may indicate to the UE 115-b a handover procedure to a second (e.g., target) cell served by the second (e.g., target) base station 105-d. In some cases, the handover command may indicate that the UE 115-b is to perform a make-before-break handover. In some cases, the handover command may include a conditional handover parameter. For example, the handover command may indicate that the UE 115-b is to monitor one or more parameters associated with the second cell (or a group of additional cells) and if a threshold is satisfied, then the UE 115-b should initiate a handover procedure with the target base station 105-d.

At 320, the UE 115-b may initiate a connection procedure with the target base station 105-d, for example, by transmitting a connection request to the target base station 105-d. In some cases, the connection request may be part of a random access procedure and may include a random access message transmitted via a random access channel (RACH) to the target base station 105-d. In other cases, the source base station 105-c may send a handover request to the target base station 105-d. In response, the UE 115-b may receive an RRC connection reconfiguration from the target base station 105-d via the source base station 105-c, prior to transmitting a connection request (such as a random access request).

The random access procedure may be contention based or contention-less. In some cases, the UE 115-b and target base station 105-d may perform a four-step random access procedure. In other cases, the UE 115-b and target base station 105-d may perform a two-step random access procedure. In other examples, the UE 115-b and target base station 105-d may perform a RACH-less connection procedure.

At 325, and while the UE 115-b and target base station 105-d are performing the connection procedure 320, the UE 115-b may modify one or more aspects of the source connection between the UE 115-b and the source base station 105-c. In some cases, the UE 115-b may remain in a connected state for the source cell. Modifying the source connection may include the UE 115-b suspending one or more SRBs. In some cases, the UE 115-b may suspend communications with the source base station 105-c over one or more SRBs in response to receiving the handover command (e.g., at 310). In other examples, the UE 115-b may suspend one or more SRBs with the source base station 105-c based on initiating the connection procedure (e.g., at 320). In cases where the UE 115-b is configured to perform a conditional handover, the UE 115-b may suspend one or more SRBs upon the condition for initiating a handover procedure being satisfied. Alternatively, the UE 115-b may continue to perform one or more SRB communications with the source base station 105-c until the connection procedure with the target base station 105-d is successful (e.g., the RRC reconfiguration is complete).

Maintaining a connected state between the UE 115-b and source base station 105-c may include configuring one or more fallback parameters for one or more SRBs. For example, if an SRB was suspended upon the UE 115-b receiving a handover command (e.g., at 310) or initiating a connection procedure (e.g., at 320), the UE 115-b may resume communications over the SRB upon fallback to the source cell (e.g., based on a failure of the connection procedure or RLF occurring for the target cell).

At 325, modifying the source connection may also include the UE 115-b or the source base station 105-c configuring updated parameters for one or more DRBs from the source connection. In some cases, the UE 115-b may configure uplink (UL) DRBs independently of downlink (DL) DRBs. For example, the UE 115-b may suspend UL DRBs upon successful completion of the connection procedure (e.g., initiated at 320), and may resume communication via the UL DRBs upon fallback of the UE 115-b to the source cell. Additionally or alternatively, the UE 115-b may continue to communicate via DL DRBs until the UE 115-b receives a release indication. For example, UE 115-b may receive a release indication from the target cell to release DRBs on the source cell.

At 325, modifying the source connection may further include configuring other messaging over the communication connection such as paging monitoring, RLM messages, BFR messages, RRM messages, or the like. For example, the UE 115-b may suspend paging monitoring during the connection procedure with the target base station 105-d based on receiving the handover command (e.g., at 310) or initiating a connection procedure (e.g., at 320). In some cases, maintaining a source connection between the UE 115-b and the source base station 105-c may include resuming paging messaging upon the UE 115-b falling back to the source base station 105-c during the connection procedure (e.g., based on a failure of the connection procedure or RLF occurring for the target cell).

Additionally or alternatively, RLM and BFR communications between the UE 115-b and the source base station 105-c may continue until the connection procedure with the target base station 105-d is successful. In some cases, the UE 115-b and source base station 105-b may configure the source cell such that an RLF procedure does not trigger an RRC re-establishment until the connection procedure with the target cell fails or is otherwise unsuccessful. In other examples, the UE 115-b and source base station 105-c may modify the source connection to suspend RRM processes upon the UE 115-b receiving a handover command (e.g., at 310). For example, this may include the UE 115-b suspending serving cell measurements. Suspending RRM processes may also include suspending measurements for a measurement gap for the first cell, releasing the measurement gap for the first cell, suppressing monitoring for one or more RRM events, or suppressing reporting of serving cell measurements or RRM events to the source cell.

At 330, in some cases, the source base station 105-c may also modify the source connection, which may be done in similar or complementary ways to step 325. In some cases, the source base station 105-c may suspend transmitting configuration messages to the UE 115-b over one or more SRBs. For example, the source base station 105-c may suspend one or more SRBs between the source base station 105-c and the UE 115-b based on transmitting the handover command to the UE 115-b.

At 335, the source base station 105-c may transmit a configuration message (e.g., an RRC message) to the UE 115-b via the SRB during the connection procedure of the UE 115-b with the target base station 105-d. In some examples, the configuration message may have been initiated prior to the initiation of the connection procedure at 320.

At 340, the UE 115-b may suppress communications with the source base station 105-c over one or more SRBs in response to receiving the handover command (e.g., at 310). For example, the UE 115-b may ignore, discard or not processes messages (e.g., configuration messages) received from the source base station 105-c over the SRB. In some cases, this may include the UE 115-a suppressing messages over the one or more SRBs with the source base station, for example, by not updating the one or more configurations at the UE 115-b.

At 345, the source base station 105-c may transmit one or more data messages to the UE 115-b via one or more DRBs. In some cases, the data messages may include application data.

At 350, the UE 115-b may receive and process data messages received via the one or more DRBs, for example, while the UE 115-b is performing the connection procedure with the target base station 105-d (e.g., initiated at 320). In some cases, the UE 115-b may continue to receive data messages from the source base station 105-c via the DRB until the UE 115-b receives an indication from the target base station 105-d to release the DRBs configured over the source cell.

At 355, the UE 115-b and target base station 105-d may establish a communication connection, for example, based on the successful completion of the connection procedure (e.g., initiated at 320). In some cases, this may include the UE 115-b receiving a successful RRC reconfiguration complete message. The UE 115-b may suspend DRBs with the source base station 105-c based on determining that the connection procedure with the target cell was successful. In some examples, the target base station 105-d may send an indication to the UE 115-b to release the source connection, which may include an indication to release one or more of the SRBs, the DRBs, paging messages, RLM processes, BFR processes, RRM processes, or the like. In some cases, establishing a communication connection may include the UE 115-b and base stations 105-c or 105-d being in a connected state. In a connected state the UE 115-b may monitor configuration information (e.g., RRC messages), receive a timing advance from the target base station 105-d, monitor a PDCCH, have networked controlled mobility, or the like.

At 355, the UE 115-b and target base station 105-d may establish a second DRB for communicating data (e.g., application data) with the target base station 105-d. The second DRB may operate simultaneously to one or more DRBs between the UE 115-b and the source base station 105-c (e.g., prior to releasing the source DRBs).

At 360, the UE 115-b and source base station 105-c may release the source connection. In some cases, this may be in response to receiving an indication from the target base station 105-*d* to release the source connection (e.g., SRBs, DRBs, etc.).

At 365, the UE 115-*b* and target base station 105-*d* may fail to establish a communication connection. For example, the communication connection may fail if successful completion of the connection procedure (e.g., initiated at 320) does not occur at 355 or if RLF occurs between the UE 115-*b* and the target base station 105-*d*.

At 360, the UE 115-*b* may resume the source connection with the source cell. In some cases, this may include the UE 115-*b* falling back to (e.g., re-establishing, activating, unsuspending) the source connection with the source base station 105-*c*. For example, this may include resuming communications for the one more SRBs or DRBs, resuming paging messages or RLM, BFR, or RRM processes, or the like, with the source base station 105-*c*.

Figure 4:
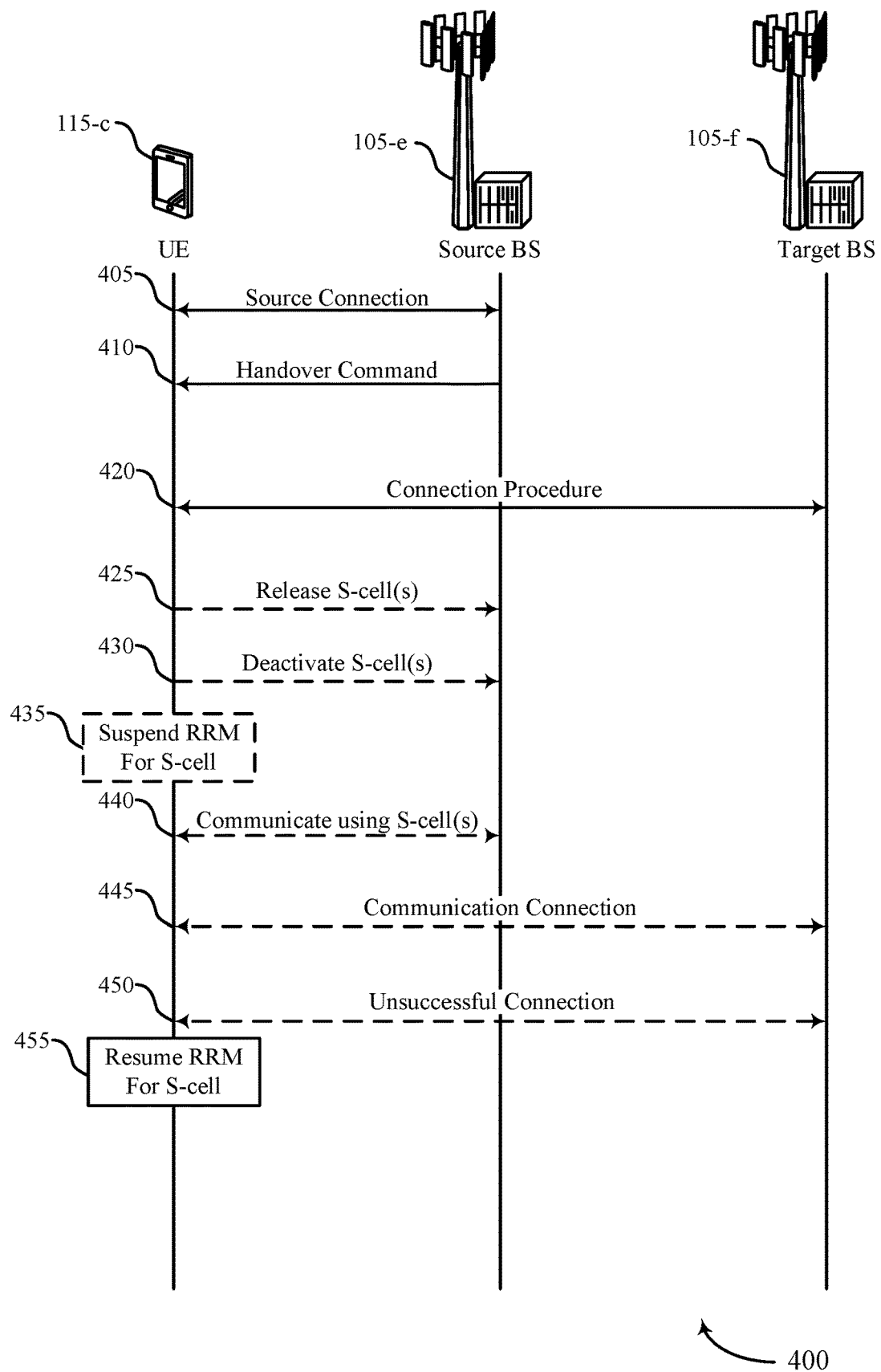
FIG. 4 illustrates an example of a process flow in the carrier aggregation context that supports source cell connection handling during make-before-break handover in accordance with aspects of the present disclosure.

FIG. 4 illustrates an example of a process flow 400 that supports source cell connection handling during make-before-break handover in a carrier aggregation context in accordance with aspects of the present disclosure. In some examples, the carrier aggregation process flow 400 may be implemented by aspects of wireless communication systems 100 and 200, and may include aspects of process flow 300 described with reference to FIGS. 1-3. The process flow includes a UE 115-*c*, which may be an example of UEs 115, 115-*a* or 115-*b* described with reference to FIGS. 1-3; and base stations 105-*e* (e.g., source base station) and 105-*f* (e.g., target base station), which may be examples of base stations 105, 105-*a*, 105-*b*, 105-*c* or 105-*d* described with reference to FIGS. 1-3. The process flow 400 includes functions and communications implemented by UE 115-*c* and base stations 105-*e* and 105-*f* in the context of managing carrier aggregation during a handover procedure between the source base station 105-*e* and the target base station 105-*f*.

At 405, the UE 115-*c* may communicate with a first (e.g., source) cell served by the source base station 105-*e* over a source connection according to a carrier aggregation configuration. In some cases, the carrier aggregation configuration may include a first primary cell served by the source base station 105-*e* and one or more second cells served by the source base station 105-*e*. The source connection may include communications between the UE 115-*c* and the source base station via one or more SRBs and one or more DRBs. In some cases, the UE 115-*c* and the source base station 105-*e* may communicate configuration information, such as RRC signaling, via one or more SRBs over the source connection. In some cases, the configuration information may be communicated over one or more primary cells. The UE 115-*c* and base station 105-*e* may also communicate data, such as application data, via one or more DRBs over the source connection. The data may be communicated over the one or more primary cells, the one or more secondary cells, or a combination thereof. In some examples, the source connection may also include paging messages (e.g., signal information updates, public warning systems, or the like) or RLM, BFR, or RRM processes or the like.

At 410, the source base station 105-*e* may transmit a handover command to the UE 115-*c*. The handover command may indicate to the UE 115-*c* a handover procedure to a second (e.g., target) cell served by the second (e.g., target) base station 105-*f*. In some cases, the handover command may indicate handover of the first primary cell to a second primary cell served by the target base station 105-*f*. In some cases, the handover command may include a conditional handover parameter. For example, the handover command may indicate that the UE 115-*c* is to monitor one or more parameters associated with the second cell (or a set of cells including the second cell and other cells) and if a threshold is satisfied, then the UE 115-*c* should initiate a handover procedure with the target base station 105-*f*.

At 420, the UE 115-*b* may initiate a connection procedure with the second primary cell served by the target base station 105-*f*, for example, by transmitting a connection request to the target base station 105-*f*. In some cases, the connection request may be part of a random access procedure and may include a random access message transmitted via a RACH to the target base station 105-*f*. In other cases, the source base station 105-*e* may send a handover request to the target base station 105-*f* In response, the UE 115-*c* may receive an RRC connection reconfiguration from the target base station 105-*f* via the source base station 105-*e*, prior to transmitting a connection request (such as a random access request).

The UE 115-*c* may initiate the connection procedure with the target base station 105-*f* while maintaining a connected state with the first primary cell. This may include the UE 115-*c* managing one or more communication connections with the source base station 105-*e*, for example, updating the source connection as described with reference to FIG. 3.

The random access procedure may be contention based or contention-less. In some cases, the UE 115-*c* and target base station 105-*f* may perform a four-step random access procedure. In other cases, the UE 115-*c* and target base station 105-*f* may perform a two-step random access procedure. In other examples, the UE 115-*c* and target base station 105-*f* may perform a RACH-less connection procedure.

The UE 115-*c*, source base station 105-*e*, and target base station 105-*f* may coordinate handling of the secondary cells during a transfer of the primary cells from the source base station 105-*e* to the target base station 105-*f*. The secondary cells may be handled in a variety of ways to maintain synchronization between the UE 115-*c* carrier aggregation configuration and the network carrier aggregation configuration. For example, the secondary cells may be released (e.g., at 425), deactivated (e.g., at 430), or remain in an activated state (e.g., at 440).

In a first example, the UE 115-*c* may release the secondary cells served by the source base station 105-*e* from the carrier aggregation configuration at 425. For example, the UE 115-*c* may release the secondary cells in response to receiving the handover command (e.g., at 410). In other examples, the UE 115-*c* may release the secondary cells in response to initiating a connection procedure with the target base station 105-*f*. In some cases, the UE 115-*c* may continue to communicate with the source base station 105-*e* during the connection procedure over the first primary cell. For example, as described herein, the UE 115-*c* may modify the source connection to configure one or more SRBs, DRBs, etc. This may include the UE 115-*c* suspending communications on the SRBs and continuing to maintain communications on the DRBs over the first primary cell, as described in more detail above.

In an example, the UE 115-*c* may deactivate the secondary cells served by the source base station 105-*e* at 430. As an example, the deactivation may occur based on UE 115-*c* receiving the handover command from the source base station 105-*e*. Deactivating the secondary cells may include maintaining a configured state for the secondary cells with the source base station 105-*e*. In the deactivated state, the UE 115-*c* may not perform any RRM reporting, nor can the deactivated cells be used for data communications. In this regard, the UE 115-*c* and the source base station 105-*e* may not transfer data via the secondary cells during the connection procedure with the target base station 105-*f*. For secondary cells in the deactivated state the UE 115-*c* may suspend RRM or RLM processes (e.g., suspend monitoring of RRM events, suspend measurements or reporting for CSI) for the secondary cells served by the source base station 105-*e*.

In an example, the UE 115-*c* and source base station 105-*e* may maintain one or more secondary cells in an activated state at 440 during the connection procedure (e.g., initiated at 420). This may include the UE 115-*c* and the source base station 105-*e* communicating via at least one secondary cell during the connection procedure.

At 445, the UE 115-*c* and target base station 105-*f* may establish a communication connection. As an example, the communication connection may be based on the successful completion of the connection procedure (e.g., initiated at 420). In some cases, this may include the UE 115-*c* receiving a successful RRC reconfiguration complete message. In some examples, the target base station 105-*f* may send an indication to the UE 115-*c* to release the source connection, which may include an indication to release one or more of the SRBs, the DRBs, paging messages, RLM process, BFR processes, RRM processes, or the like.

At 450, the UE 115-*c* and target base station 105-*f* may fail to establish a communication connection. As an example, the communication connection may fail if the connection procedure (e.g., initiated at 420) is not successfully completed at 445 or if RLF occurs between the UE 115-*c* and the target base station 105-*f*.

At 455, based on the failure to establish the communication connection at 450, the UE 115-*c* may resume RRM or RLM processes (e.g., RRM or RLM processes suspended at 435) for the secondary cell served by the source base station 105-*e*.

Figure 5:
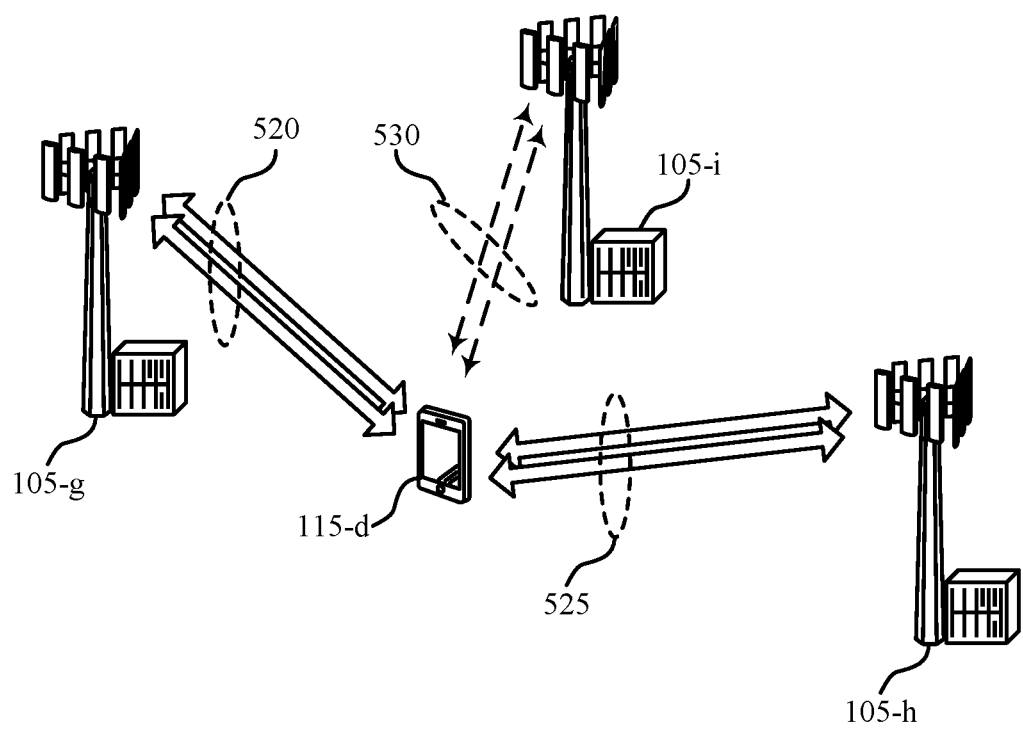
FIG. 5 illustrates an example of a system for wireless communication in the dual connectivity context that supports source cell connection handling during make-before-break handover in accordance with aspects of the present disclosure.

FIG. 5 illustrates an example of a wireless communication system 500 that supports source cell connection handling during make-before-break handover in a dual connectivity context in accordance with aspects of the present disclosure. In some examples, the wireless communication system 500 may implement aspects of wireless communication systems 100 and 200 and process flows 300 and 400. The wireless communication system 500 may include a UE 115-*d*, which may be an example of UEs 115, 115-*a*, 115-*b*, 115-*c* and 115-*d* described with reference to FIGS. 1-4; and base stations 105-*g*, 105-*h* and 105-*i*, which may be examples of base stations 105, 105-*a*, 105-*b*, 105-*c*, 105-*d*, 105-*e* and 105-*f* described with reference to FIGS. 1-4. The wireless communication system 500 illustrates an example of a handover procedure where the UE 115-*d* is configured with a dual connectivity configuration and connected to a master cell group associated with a first base station 105-*g* and a secondary cell group associated with a second base station 105-*h*.

In some cases, an initial source connection may be established where the master node is associated with a first cell group 520, which may be served by a first base station 105-*g* and a secondary node is associated with a second cell group 525, which may be served by a second base station 105-*h*. The master cell group and the secondary cell group may carry one or more SRBs or DRBs as described herein. In some cases, the master cell group may be transferred from the first cell group 520 to a new cell group as part of a make-before-break handover procedure, while the secondary cell group does not change. For example, the network may handover the master cell group from the first cell group 520 to a third cell group 530, which may be served by the third base station 105-*i*. The network may transfer the bearers (e.g., SRBs and DRBs) served by the first cell group 520 to the second cell group 525 during handing over of the master node (e.g., prior to initiation of the handover of the first cell group 520 to the third cell group 530). Further, the network may release the first cell group 520 upon completion of the handover procedure (e.g., upon RRC configuration completion for a primary cell of the third cell group 530).

Additionally or alternatively, the second cell group 525 may be handed over to a new serving base station as part of a make-before-break handover procedure, while the master cell group does not change. For example, the network may hand over the second cell group 525 to the third cell group 530, which may be served by the third base station 105-*i*. The network may transfer the bearers (e.g., SRBs and DRBs) served by the second cell group 525 to the master cell group 520 during handing over of the second cell group (e.g., prior to initiation of the handover of the second cell group 525 to the third cell group 530). Further, the network may release the second cell group 525 upon completion of the handover procedure (e.g., upon RRC configuration completion for a primary cell of the third cell group 530).

In some cases, both the master cell group and the secondary cell group may be handed over (e.g., in make-before-break handover procedures, which also may be referred to as DAPS handover procedures). For example, the network may perform a first make-before-break handover procedure for the master cell group and perform a second make-before-break handover procedure for the secondary cell group. The master cell group may be transferred from the first cell group 520 to the third cell group 530 in a first make-before-break handover procedure (e.g., while maintaining a communication connection with the first cell group 520 during the handover procedure). The network may transfer the bearers (e.g., SRBs and DRBs) served by the first cell group 520 to the second cell group 525 during handing over of the master node (e.g., prior to initiation of the handover of the first cell group 520 to the third cell group 530). Further, the network may release the first cell group 520 upon completion of the handover procedure (e.g., upon RRC configuration completion for a primary cell of the third cell group 530). The second cell group 530 may then be handed over to a fourth cell group (not shown) in a second make-before-break handover procedure. The network may transfer the bearers (e.g., SRBs and DRBs) served by the second cell group 525 to the third cell group 530 during handing over of the second cell group (e.g., prior to initiation of the handover of the second cell group 525 to the fourth cell group). Further, the network may release the second cell group 525 upon completion of the handover procedure (e.g., upon RRC configuration completion for a primary cell of the fourth cell group).

Figure 6:
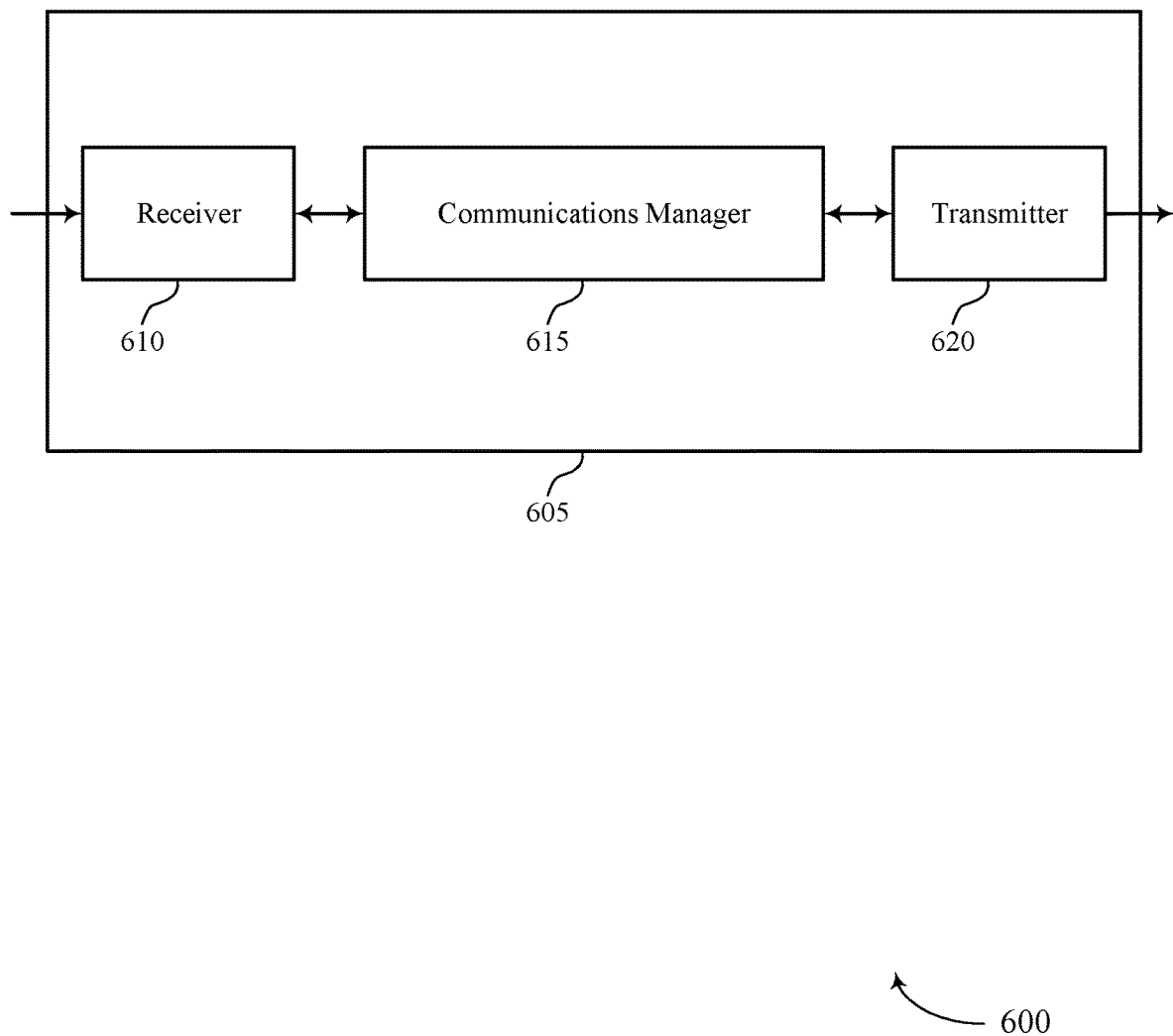
FIGS. 6 and 7 show block diagrams of devices that support source cell connection handling during make-before-break handover in accordance with aspects of the present disclosure.

FIG. 6 shows a block diagram 600 of a device 605 that supports source cell connection handling during make-before-break handover in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to source cell connection handling during make-before-break handover). Information may be passed on to other components of the device 605. The receiver 610 may be an example of aspects of the transceiver 920 described with reference to FIG. 9. The receiver 610 may utilize a single antenna or a set of antennas.

The communications manager 615 may communicate, with a first base station while in a connected state with a first cell served by the first base station, information associated with a configuration for the connected state via a signaling radio bearer and application data via a data radio bearer; suspend, during the connection procedure with the second cell, the signaling radio bearer; maintain, during the connection procedure with the second cell, the data radio bearer; receive, while in the connected state with the first cell, a handover command from the first base station indicating a handover to a second cell served by a second base station; and initiate, while in the connected state with the first cell, a connection procedure with the second cell. The communications manager 615 may also communicate according to a carrier aggregation configuration, the carrier aggregation configuration including a first primary cell served by a first base station and at least one secondary cell served by the first base station; determine a modification of the carrier aggregation configuration for the at least one secondary cell based on the receiving the handover command; receive a handover command from the first base station indicating a handover of the first primary cell to a second primary cell served by a second base station; and initiate a connection procedure to the second primary cell while maintaining a connected state with the first primary cell. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615 or its sub-components may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
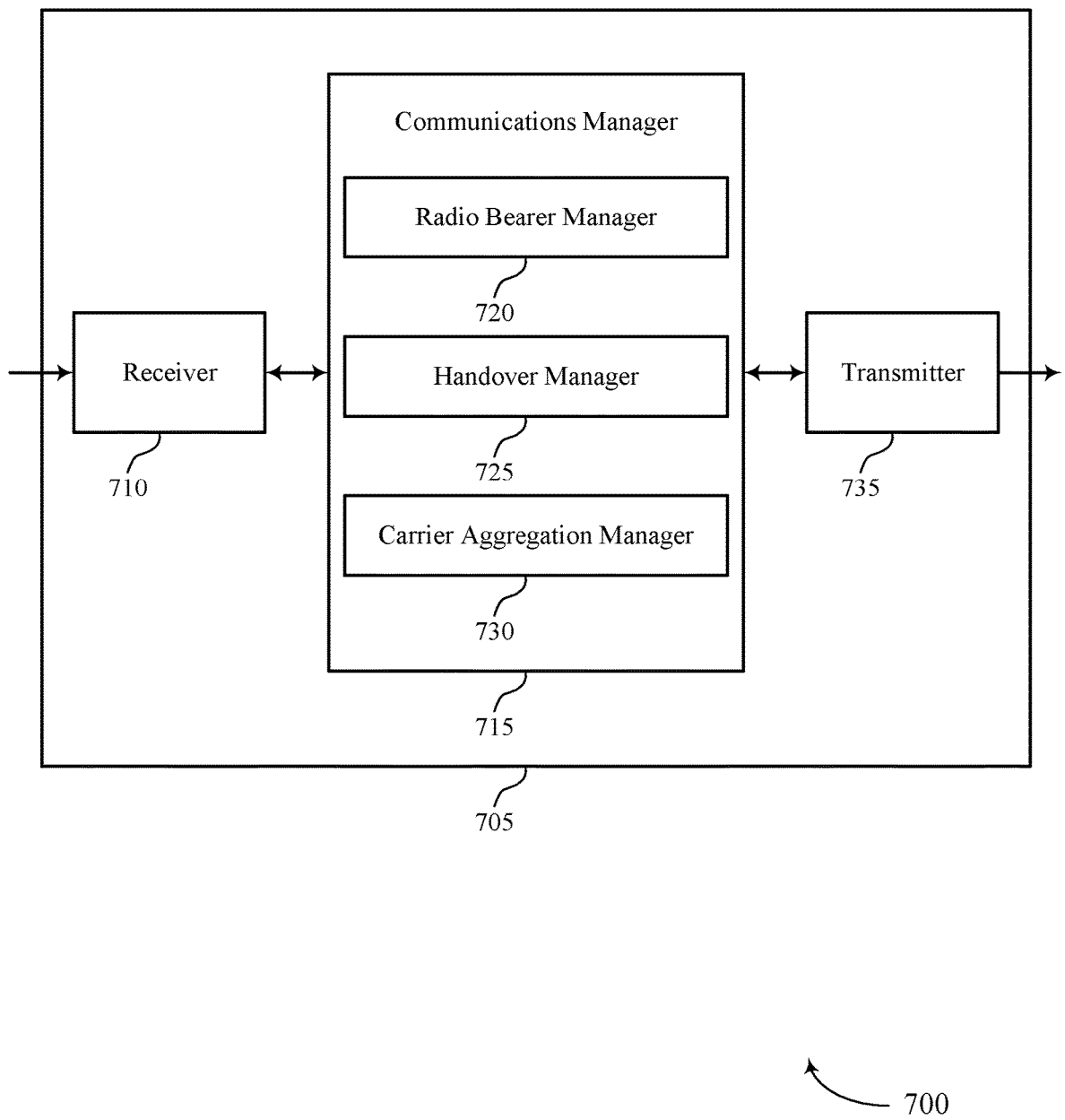

FIG. 7 shows a block diagram 700 of a device 705 that supports source cell connection handling during make-before-break handover in accordance with aspects of the present disclosure. The device 705 may be an example of aspects of a device 605 or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to source cell connection handling during make-before-break handover). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a radio bearer manager 720, a handover manager 725, and a carrier aggregation manager 730. The communications manager 715 may be an example of aspects of the communications manager 910 described herein.

The radio bearer manager 720 may communicate, with a first base station while in a connected state with a first cell served by the first base station, information associated with a configuration for the connected state via a signaling radio bearer and application data via a data radio bearer; suspend, during the connection procedure with the second cell, the signaling radio bearer; and maintain, during the connection procedure with the second cell, the data radio bearer.

The handover manager 725 may receive, while in the connected state with the first cell, a handover command from the first base station indicating a handover to a second cell served by a second base station and may initiate, while in the connected state with the first cell, a connection procedure with the second cell.

The carrier aggregation manager 730 may communicate according to a carrier aggregation configuration, the carrier aggregation configuration including a first primary cell served by a first base station and at least one secondary cell served by the first base station, and may determine a modification of the carrier aggregation configuration for the at least one secondary cell based on the receiving the handover command.

The handover manager 725 may receive a handover command from the first base station indicating a handover of the first primary cell to a second primary cell served by a second base station and may initiate a connection procedure to the second primary cell while maintaining a connected state with the first primary cell.

The transmitter 735 may transmit signals generated by other components of the device 705. In some examples, the transmitter 735 may be collocated with a receiver 710 in a transceiver. For example, the transmitter 735 may be an example of aspects of the transceiver 920 described with reference to FIG. 9. The transmitter 735 may utilize a single antenna or a set of antennas.

Figure 8:
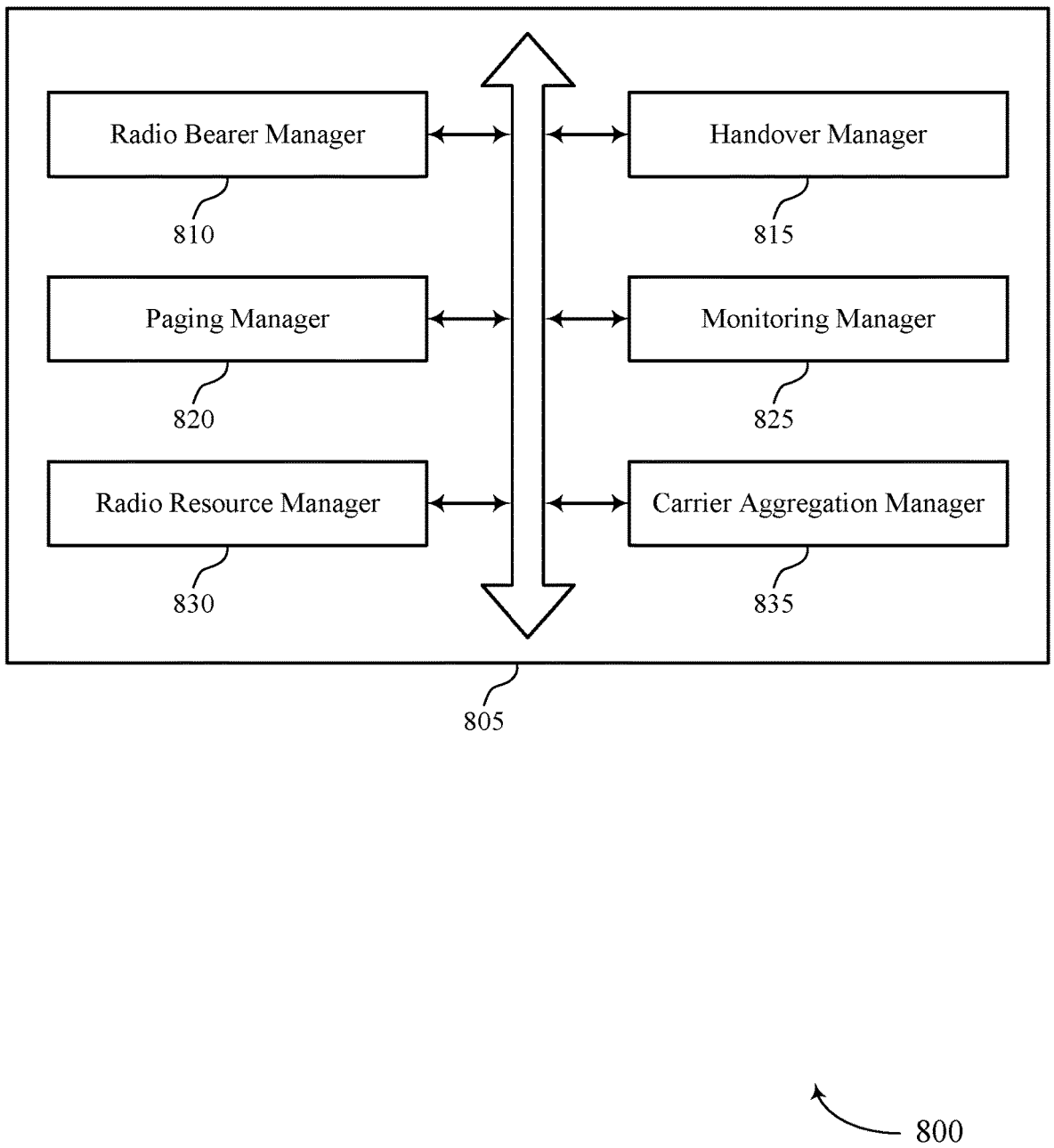
FIG. 8 shows a block diagram of a communications manager that supports source cell connection handling during make-before-break handover in accordance with aspects of the present disclosure.

FIG. 8 shows a block diagram 800 of a communications manager 805 that supports source cell connection handling during make-before-break handover in accordance with aspects of the present disclosure. The communications manager 805 may be an example of aspects of a communications manager 615, a communications manager 715, or a communications manager 910 described herein. The communications manager 805 may include a radio bearer manager 810, a handover manager 815, a paging manager 820, a monitoring manager 825, a radio resource manager 830, and a carrier aggregation manager 835. Each of these modules may communicate, directly or indirectly, with one another (e.g., via one or more buses).

The radio bearer manager 810 may communicate, with a first base station while in a connected state with a first cell served by the first base station, information associated with a configuration for the connected state via a signaling radio bearer and application data via a data radio bearer. In some examples, the radio bearer manager 810 may suspend, during the connection procedure with the second cell, the signaling radio bearer. In some examples, the radio bearer manager 810 may maintain, during the connection procedure with the second cell, the data radio bearer. The radio bearer manager 810 may receive, during the connection procedure with the second cell, a configuration message via the signaling radio bearer associated with updating the configuration for the connected state. In some cases, the radio bearer manager 810 may suppress the updating of the configuration based on the initiating of the connection procedure. The radio bearer manager 810 may communicate, during the connection procedure with the second cell, a data message associated with the application data via the data radio bearer. In some examples, the radio bearer manager 810 may suspend the data radio bearer based on determining that the connection procedure with the second cell was successful. In some examples, the radio bearer manager 810 may receive an indication from the second cell to release the data radio bearer. The radio bearer manager 810 may release the data radio bearer based on the indication. In some examples, the radio bearer manager 810 may establish, over the second cell, a second data radio bearer for communicating the application data with the second base station. The radio bearer manager 810 may resume the data radio bearer based on determining that the connection procedure was unsuccessful or that a radio link failure occurred for the second cell. In some examples, the radio bearer manager 810 may receive an indication from the second cell to release the signaling radio bearer. The radio bearer manager 810 may release the signaling radio bearer based on the indication.

The handover manager 815 may receive, while in the connected state with the first cell, a handover command from the first base station indicating a handover to a second cell served by a second base station. In some examples, the handover manager 815 may initiate, while in the connected state with the first cell, a connection procedure with the second cell. In some examples, the handover manager 815 may receive a handover command from the first base station indicating a handover of the first primary cell to a second primary cell served by a second base station. In some cases, the handover manager 815 may initiate a connection procedure to the second primary cell while maintaining a connected state with the first primary cell. The handover manager 815 may resume the signal radio bearer based on determining that the connection procedure was unsuccessful or that a radio link failure occurred for the second cell. In some cases, the handover command includes a condition for initiating the connection procedure with the second cell, and suspending the signaling radio bearer is based on determining that the condition for initiating the connection procedure is satisfied.

The paging manager 820 may suspend monitoring for at least one paging message based on receiving the handover command.

The monitoring manager 825 may continue a radio link monitoring procedure, a beam failure recovery procedure, or a combination thereof on the first cell during the connection procedure with the second cell. In some examples, the monitoring manager 825 may determine that a radio link failure has occurred on the first cell during the connection procedure with the second cell. In some examples, the monitoring manager 825 may suspend a connection re-establishment procedure.

The radio resource manager 830 may suspend, during the connection procedure with the second cell, a radio resource management procedure for the first cell. In some examples, the radio resource manager 830 may suspend measurements for a measurement gap for the first cell, releasing the measurement gap for the first cell, suppressing monitoring for one or more radio resource management events, or a combination thereof.

The carrier aggregation manager 835 may communicate according to a carrier aggregation configuration, the carrier aggregation configuration including a first primary cell served by a first base station and at least one secondary cell served by the first base station. The carrier aggregation manager 835 may determine a modification of the carrier aggregation configuration for the at least one secondary cell based on the receiving the handover command. In some examples, the carrier aggregation manager 835 may release the at least one secondary cell served by the first base station from the carrier aggregation configuration. In some cases, the carrier aggregation manager 835 may deactivate the at least one secondary cell based on receiving the handover command from the first base station. In some examples, the carrier aggregation manager 835 may maintain the at least one secondary cell in an activated state during a handover procedure with the second base station. In some cases, the deactivating the at least one secondary cell includes suspending a radio resource monitoring procedure for the at least one secondary cell.

Figure 9:
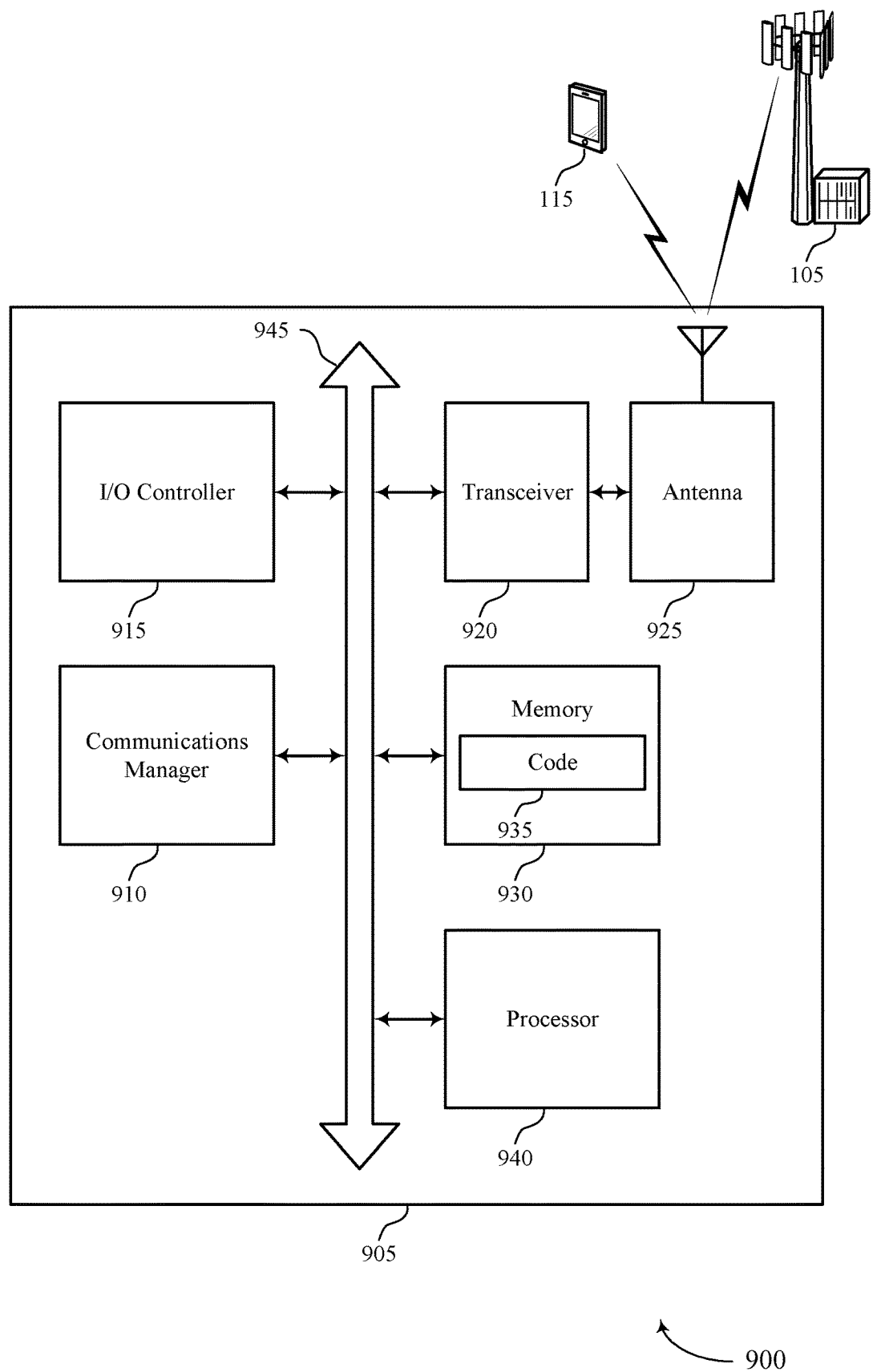
FIG. 9 shows a diagram of a system including a device that supports source cell connection handling during make-before-break handover in accordance with aspects of the present disclosure.

FIG. 9 shows a diagram of a system 900 including a device 905 that supports source cell connection handling during make-before-break handover in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may communicate, with a first base station while in a connected state with a first cell served by the first base station, information associated with a configuration for the connected state via a signaling radio bearer and application data via a data radio bearer. The communications manager 910 may suspend, during the connection procedure with the second cell, the signaling radio bearer, and may maintain, during the connection procedure with the second cell, the data radio bearer. The communications manager 910 may receive, while in the connected state with the first cell, a handover command from the first base station indicating a handover to a second cell served by a second base station, and may initiate, while in the connected state with the first cell, a connection procedure with the second cell. The communications manager 910 may also communicate according to a carrier aggregation configuration, the carrier aggregation configuration including a first primary cell served by a first base station and at least one secondary cell served by the first base station; determine a modification of the carrier aggregation configuration for the at least one secondary cell based on the receiving the handover command; receive a handover command from the first base station indicating a handover of the first primary cell to a second primary cell served by a second base station; and initiate a connection procedure to the second primary cell while maintaining a connected state with the first primary cell.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting source cell connection handling during make-before-break handover).

Figure 10:
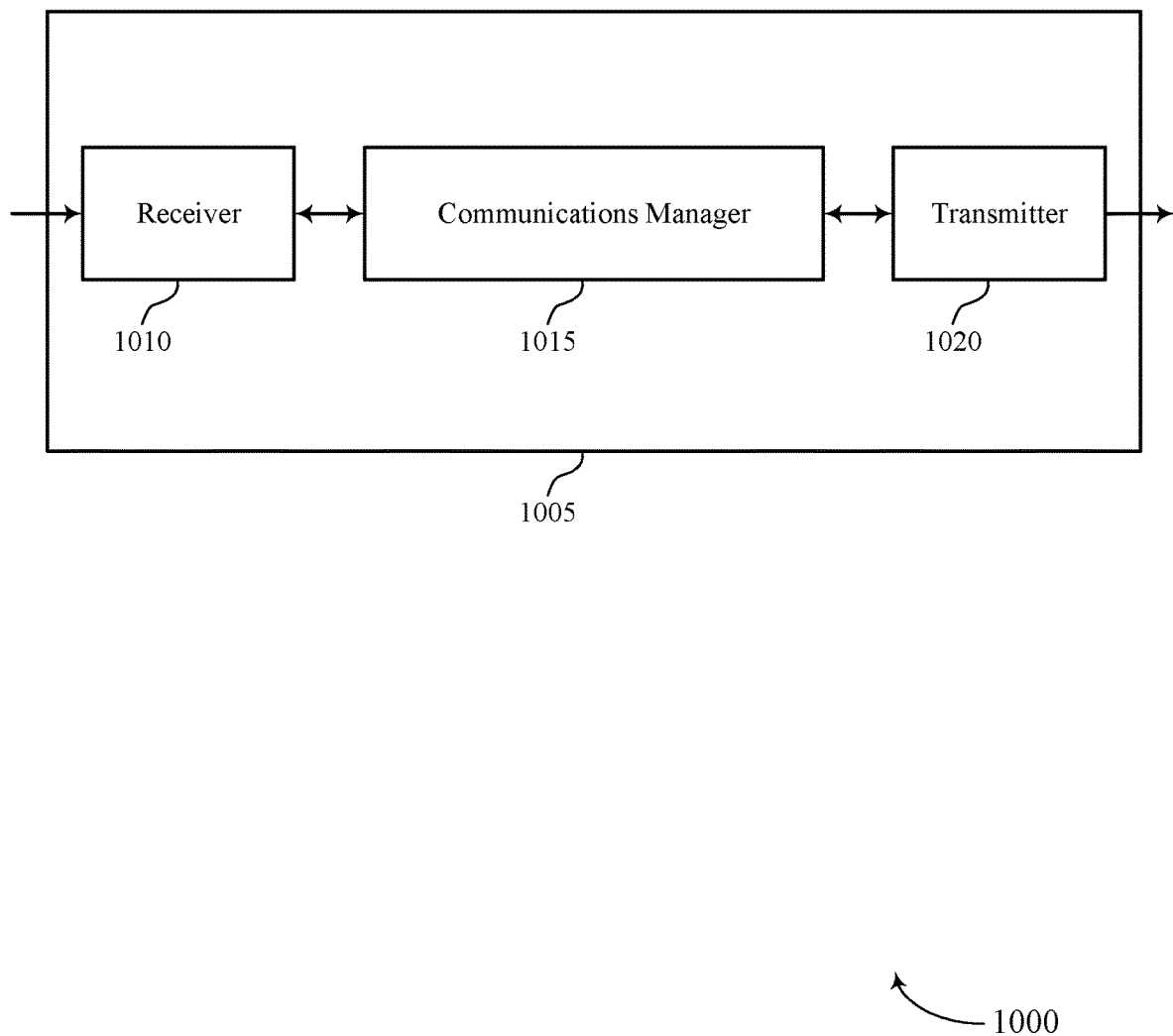
FIGS. 10 and 11 show block diagrams of devices that support source cell connection handling during make-before-break handover in accordance with aspects of the present disclosure.

FIG. 10 shows a block diagram 1000 of a device 1005 that supports source cell connection handling during make-before-break handover in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to source cell connection handling during make-before-break handover). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may communicate, with a first UE, information associated with a configuration for a connected state for the UE via a signaling radio bearer and application data via a data radio bearer; suspend the signaling radio bearer based on transmitting the handover command; maintain the data radio bearer after transmitting the handover command; and transmit a handover command to the UE indicating a handover to a second cell served by a second base station. The communications manager 1015 may also configure a UE according to a carrier aggregation configuration, the carrier aggregation configuration including a first primary cell served by the base station and at least one secondary cell served by the base station; communicate with the UE via the first primary cell and the at least one secondary cell; determine a modification of the carrier aggregation configuration based on the transmitting the handover command; and transmit, to the UE, a handover command indicating a handover of communications from the first primary cell to a second primary cell served by a second base station. The communications manager 1015 may also configure a UE with a dual connectivity configuration including a master cell group associated with a first base station and a secondary cell group associated with a second base station; communicate with the UE via one or more bearers associated with one or more carriers of the master cell group or the secondary cell group; determine to handover one of the master cell group or the secondary cell group to a third base station; and transfer the one or more bearers to the other of the master cell group or the secondary cell group prior to releasing the one of the master cell group or the secondary cell group from the dual connectivity configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015 or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
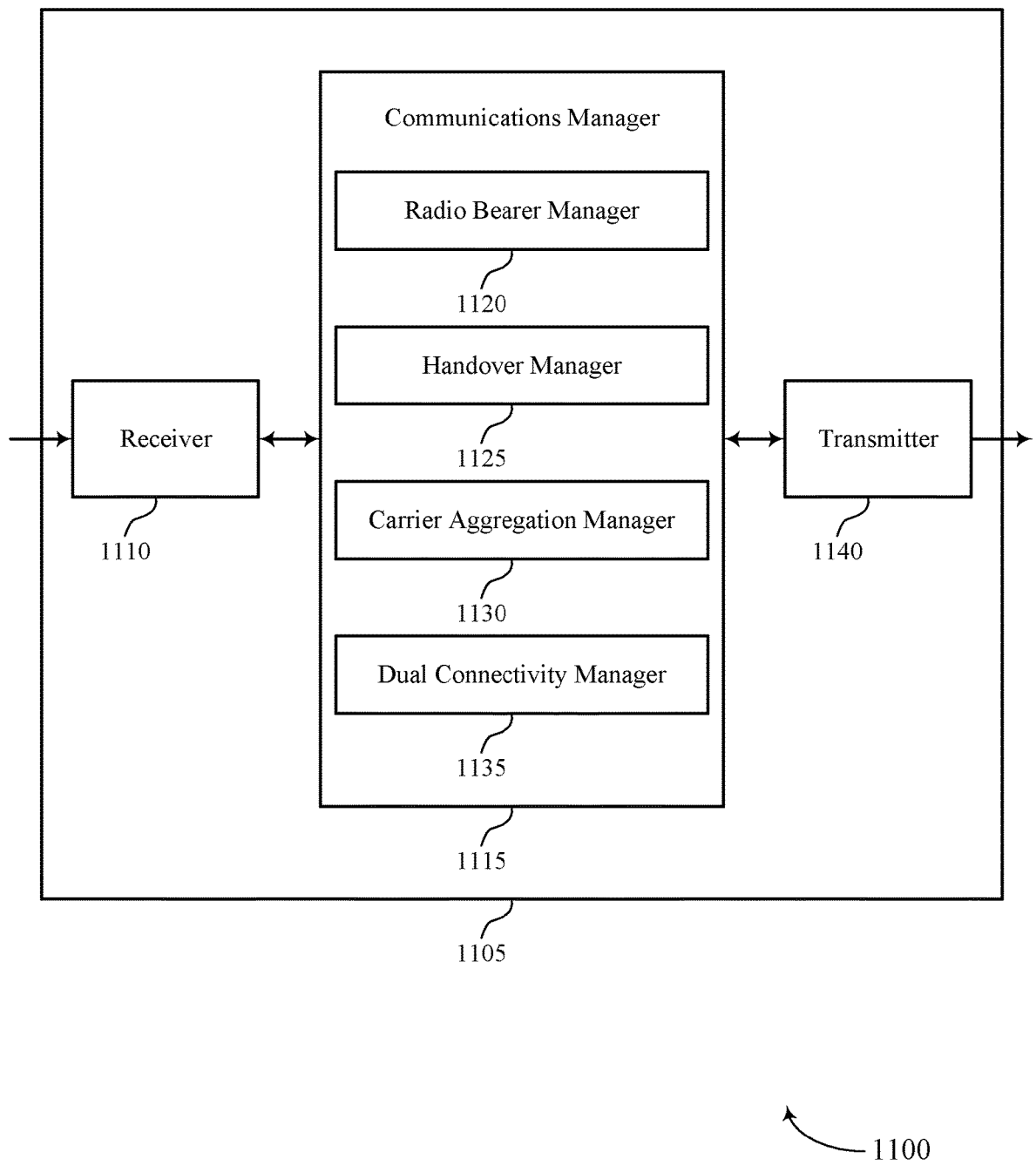

FIG. 11 shows a block diagram 1100 of a device 1105 that supports source cell connection handling during make-before-break handover in accordance with aspects of the present disclosure. The device 1105 may be an example of aspects of a device 1005 or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to source cell connection handling during make-before-break handover). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a radio bearer manager 1120, a handover manager 1125, a carrier aggregation manager 1130, and a dual connectivity manager 1135. The communications manager 1115 may be an example of aspects of the communications manager 1310 described herein.

The radio bearer manager 1120 may communicate, with a first UE, information associated with a configuration for a connected state for the UE via a signaling radio bearer and application data via a data radio bearer, suspend the signaling radio bearer based on transmitting the handover command, and maintain the data radio bearer after transmitting the handover command.

The handover manager 1125 may transmit a handover command to the UE indicating a handover to a second cell served by a second base station.

The carrier aggregation manager 1130 may configure a UE according to a carrier aggregation configuration, the carrier aggregation configuration including a first primary cell served by the base station and at least one secondary cell served by the base station; communicate with the UE via the first primary cell and the at least one secondary cell; and determine a modification of the carrier aggregation configuration based on the transmitting the handover command.

The handover manager 1125 may transmit, to the UE, a handover command indicating a handover of communications from the first primary cell to a second primary cell served by a second base station. The handover manager 1125 may determine to handover one of the master cell group or the secondary cell group to a third base station and transfer the one or more bearers to the other of the master cell group or the secondary cell group prior to releasing the one of the master cell group or the secondary cell group from the dual connectivity configuration.

The dual connectivity manager 1135 may configure a UE with a dual connectivity configuration including a master cell group associated with a first base station and a secondary cell group associated with a second base station, and may communicate with the UE via one or more bearers associated with one or more carriers of the master cell group or the secondary cell group.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
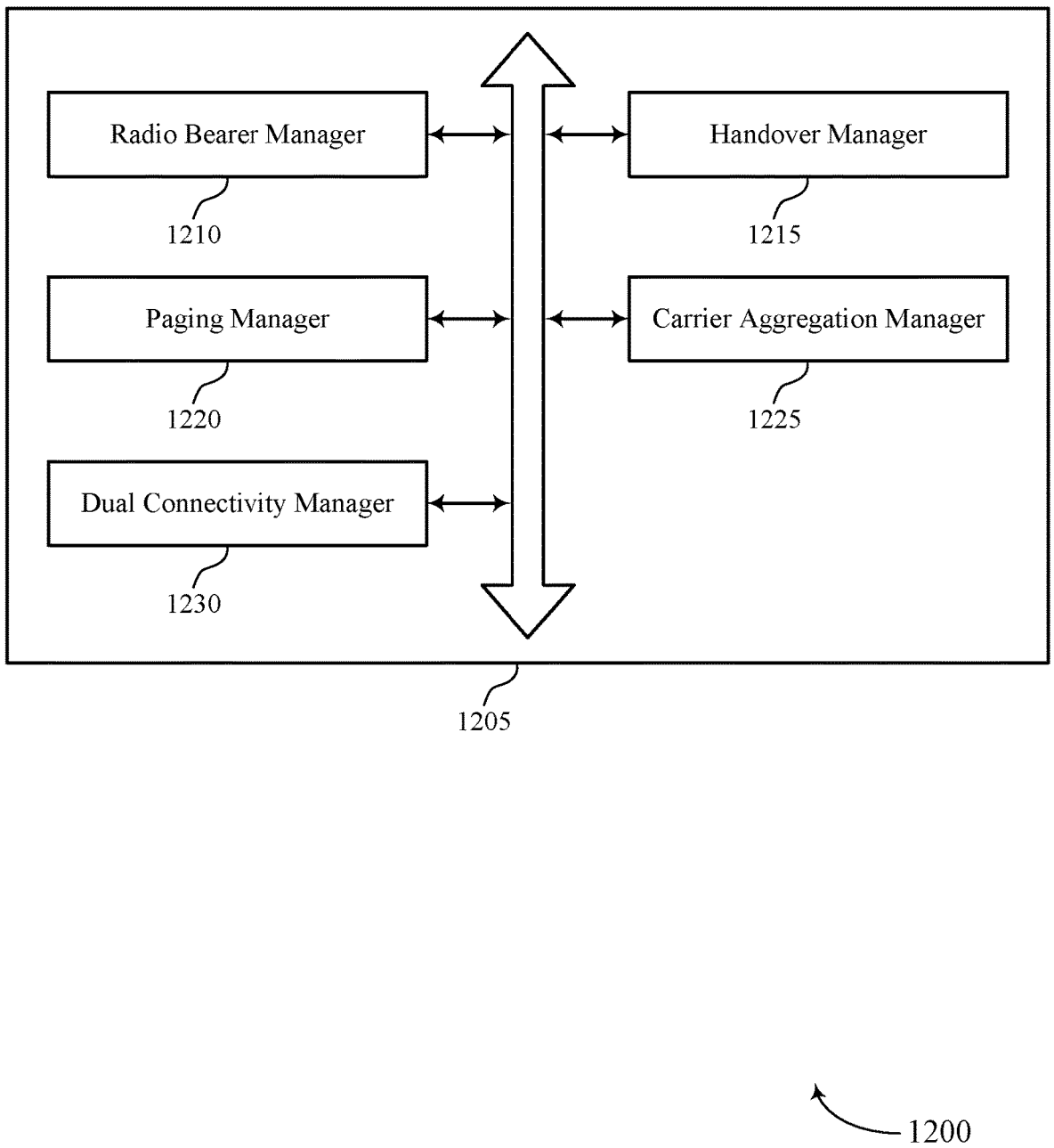
FIG. 12 shows a block diagram of a communications manager that supports source cell connection handling during make-before-break handover in accordance with aspects of the present disclosure.

FIG. 12 shows a block diagram 1200 of a communications manager 1205 that supports source cell connection handling during make-before-break handover in accordance with aspects of the present disclosure. The communications manager 1205 may be an example of aspects of a communications manager 1015, a communications manager 1115, or a communications manager 1310 described herein. The communications manager 1205 may include a radio bearer manager 1210, a handover manager 1215, a paging manager 1220, a carrier aggregation manager 1225, and a dual connectivity manager 1230. Each of these modules may communicate, directly or indirectly, with one another (e.g., via one or more buses).

The radio bearer manager 1210 may communicate, with a first UE, information associated with a configuration for a connected state for the UE via a signaling radio bearer and application data via a data radio bearer. In some examples, the radio bearer manager 1210 may suspend the signaling radio bearer based on transmitting the handover command. In some cases, the radio bearer manager 1210 may maintain the data radio bearer after transmitting the handover command. The radio bearer manager 1210 may communicate, to the UE, a data message associated with the application data via the data radio bearer after transmitting the handover command. In some examples, the radio bearer manager 1210 may transmit a release message to the UE to release the data radio bearer. The radio bearer manager 1210 may suspend the data radio bearer based on receiving the indication. In some examples, the radio bearer manager 1210 may resume the data radio bearer based on determining that a radio link failure occurred between the UE and the second cell. The radio bearer manager 1210 may transmit a release message to the UE to release the signaling radio bearer based on receiving the indication. In some examples, the radio bearer manager 1210 may resume the signaling radio bearer based on receiving an indication that a connection procedure between the UE and the second cell was unsuccessful or that a radio link failure occurred between the UE and the second cell. In some cases, the suspending the signaling radio bearer includes suppressing one or more configuration messages associated with updating the configuration for the connected state for the UE.

The handover manager 1215 may transmit a handover command to the UE indicating a handover to a second cell served by a second base station. In some examples, the handover manager 1215 may transmit, to the UE, a handover command indicating a handover of communications from the first primary cell to a second primary cell served by a second base station. The handover manager 1215 may determine to handover one of the master cell group or the secondary cell group to a third base station. In some examples, the handover manager 1215 may transfer the one or more bearers to the other of the master cell group or the secondary cell group prior to releasing the one of the master cell group or the secondary cell group from the dual connectivity configuration. In some examples, the handover manager 1215 may receive an indication that a connection procedure between the UE and the second cell was successful. In some cases, the handover manager 1215 may receive an indication that a connection procedure between the UE and the second cell was successful. The handover manager 1215 may determine to handover the other of the master cell group or the secondary cell group to a fourth base station. In some cases, the handover command includes a condition for initiating a connection procedure with the second cell.

The paging manager 1220 may suspend sending at least one paging message based on transmitting the handover command.

The carrier aggregation manager 1225 may configure a UE according to a carrier aggregation configuration, the carrier aggregation configuration including a first primary cell served by the base station and at least one secondary cell served by the base station. The carrier aggregation manager 1225 may communicate with the UE via the first primary cell and the at least one secondary cell. In some examples, the carrier aggregation manager 1225 may determine a modification of the carrier aggregation configuration based on the transmitting the handover command. The carrier aggregation manager 1225 may release the at least one secondary cell from the carrier aggregation configuration. In some cases, the carrier aggregation manager 1225 may deactivate the at least one secondary cell for the carrier aggregation configuration. In some examples, the carrier aggregation manager 1225 may maintain, for the carrier aggregation configuration, the at least one secondary cell in an activated state. In some examples, the carrier aggregation manager 1225 may receive one or more capabilities of the UE, where maintaining the at least one secondary cell in an activated state is based on the one or more capabilities of the UE. The carrier aggregation manager 1225 may communicate, with the second base station, at least one message for determining the carrier aggregation configuration.

The dual connectivity manager 1230 may configure a UE with a dual connectivity configuration including a master cell group associated with a first base station and a secondary cell group associated with a second base station. In some examples, the dual connectivity manager 1230 may communicate with the UE via one or more bearers associated with one or more carriers of the master cell group or the secondary cell group. In some examples, the dual connectivity manager 1230 may release the first set of secondary cells or the second set of secondary cells based on determining to handover the master cell group or the secondary cell group. In some examples, the dual connectivity manager 1230 may transfer one or more additional bearers from the other of the master cell group or the secondary cell group to a cell group served by the third base station prior to releasing the other of the master cell group or the secondary cell group from the dual connectivity configuration.

Figure 13:
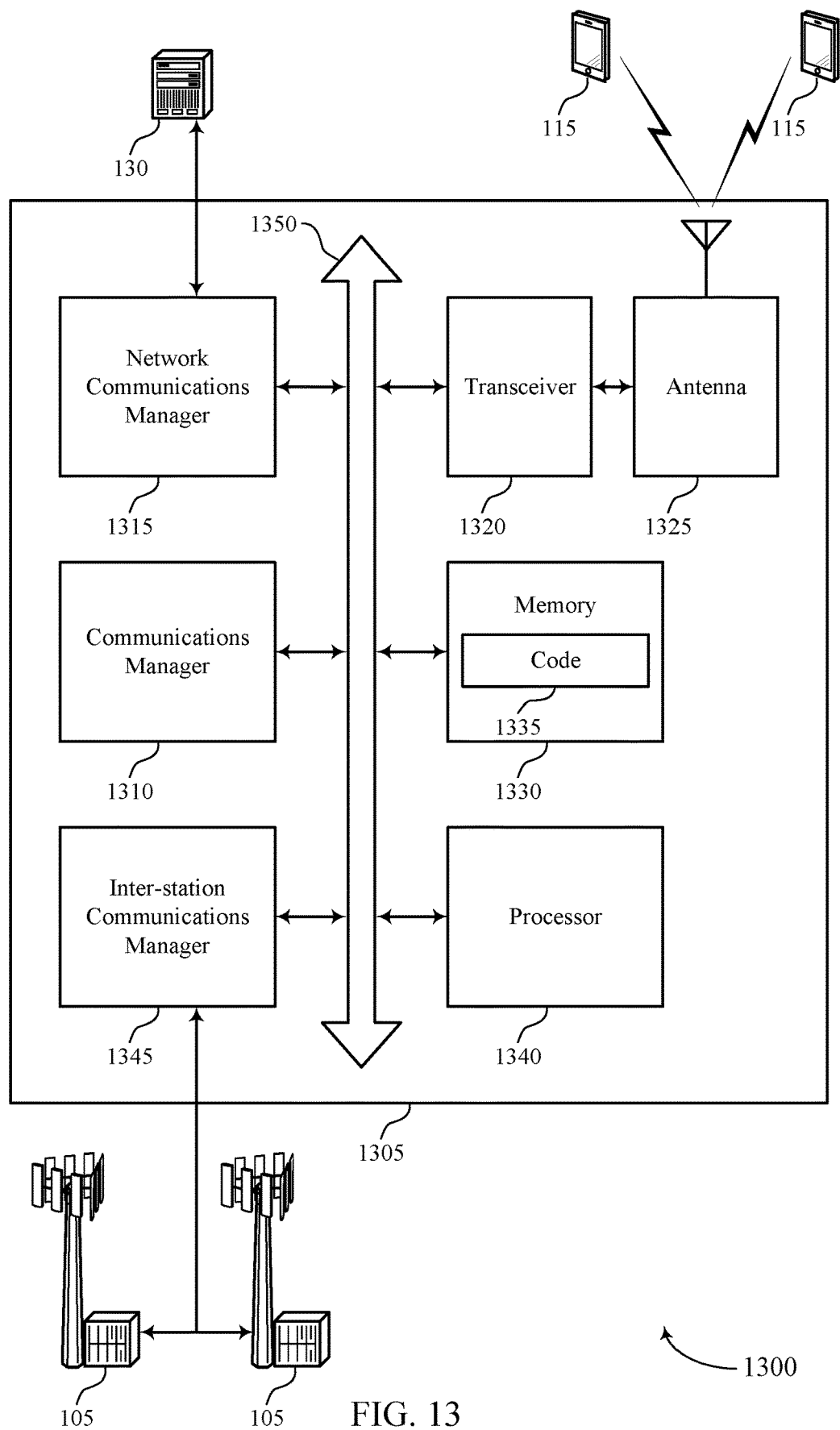
FIG. 13 shows a diagram of a system including a device that supports source cell connection handling during make-before-break handover in accordance with aspects of the present disclosure.

FIG. 13 shows a diagram of a system 1300 including a device 1305 that supports source cell connection handling during make-before-break handover in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may communicate, with a first UE, information associated with a configuration for a connected state for the UE via a signaling radio bearer and application data via a data radio bearer; suspend the signaling radio bearer based on transmitting the handover command; maintain the data radio bearer after transmitting the handover command; and transmit a handover command to the UE indicating a handover to a second cell served by a second base station. The communications manager 1310 may also configure a UE according to a carrier aggregation configuration, the carrier aggregation configuration including a first primary cell served by the base station and at least one secondary cell served by the base station; communicate with the UE via the first primary cell and the at least one secondary cell; determine a modification of the carrier aggregation configuration based on the transmitting the handover command; and transmit, to the UE, a handover command indicating a handover of communications from the first primary cell to a second primary cell served by a second base station. The communications manager 1310 may also configure a UE with a dual connectivity configuration including a master cell group associated with a first base station and a secondary cell group associated with a second base station; communicate with the UE via one or more bearers associated with one or more carriers of the master cell group or the secondary cell group; determine to handover one of the master cell group or the secondary cell group to a third base station; and transfer the one or more bearers to the other of the master cell group or the secondary cell group prior to releasing the one of the master cell group or the secondary cell group from the dual connectivity configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340), cause the device to perform various functions described herein. In some cases, the memory 1330 may contain, among other things, a BIOS which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting source cell connection handling during make-before-break handover).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

Figure 14:
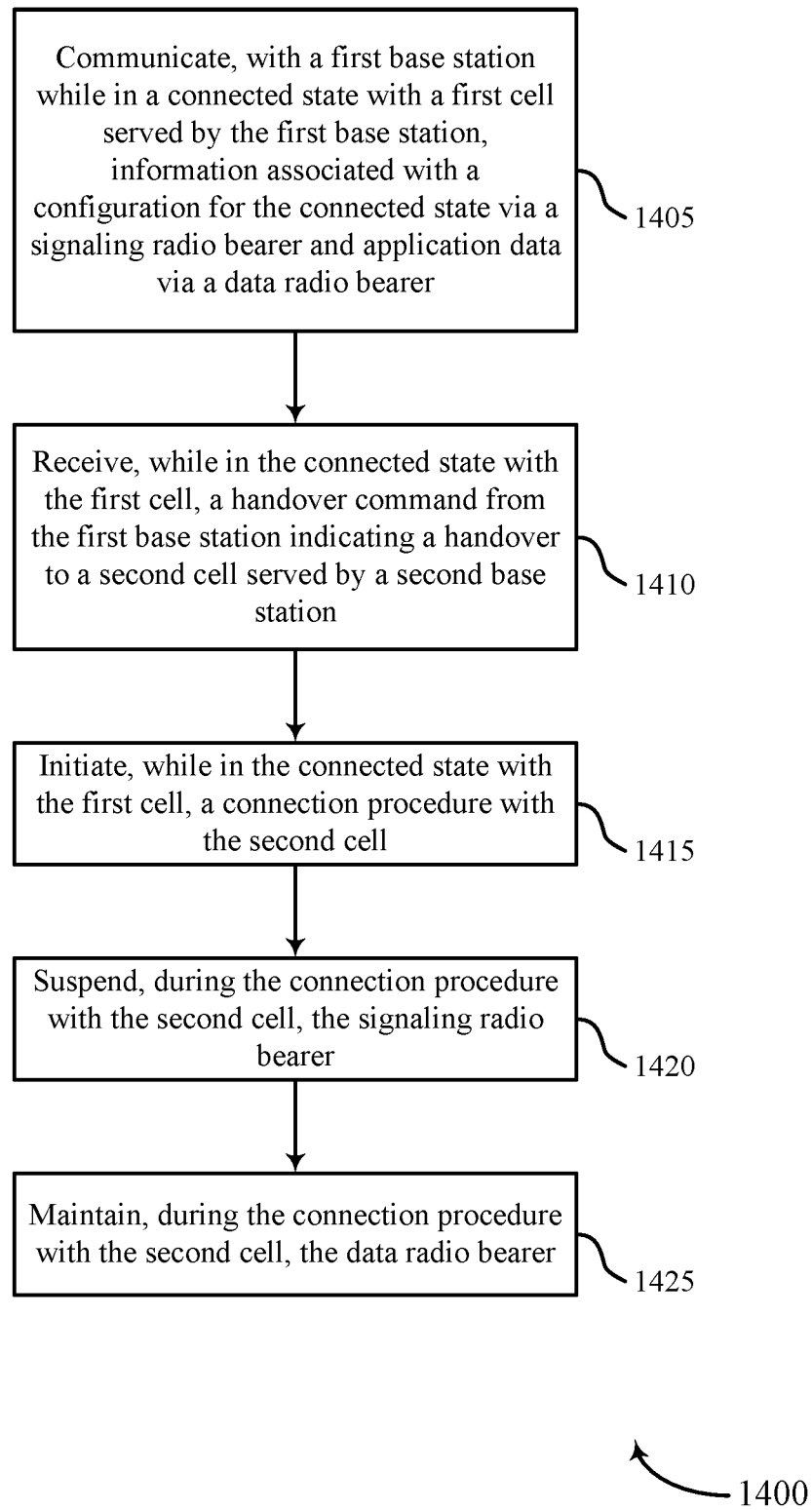
FIGS. 14 through 19 show flowcharts illustrating methods that support source cell connection handling during make-before-break handover in accordance with aspects of the present disclosure.

FIG. 14 shows a flowchart illustrating a method 1400 that supports source cell connection handling during make-before-break handover in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may communicate, with a first base station while in a connected state with a first cell served by the first base station, information associated with a configuration for the connected state via a signaling radio bearer and application data via a data radio bearer. The operations of 1405 may be performed according to the methods described herein. In some examples, aspects of the operations of 1405 may be performed by a radio bearer manager as described with reference to FIGS. 6 through 9.

At 1410, the UE may receive, while in the connected state with the first cell, a handover command from the first base station indicating a handover to a second cell served by a second base station. The operations of 1410 may be performed according to the methods described herein. In some examples, aspects of the operations of 1410 may be performed by a handover manager as described with reference to FIGS. 6 through 9.

At 1415, the UE may initiate, while in the connected state with the first cell, a connection procedure with the second cell. The operations of 1415 may be performed according to the methods described herein. In some examples, aspects of the operations of 1415 may be performed by a handover manager as described with reference to FIGS. 6 through 9.

At 1420, the UE may suspend, during the connection procedure with the second cell, the signaling radio bearer. The operations of 1420 may be performed according to the methods described herein. In some examples, aspects of the operations of 1420 may be performed by a radio bearer manager as described with reference to FIGS. 6 through 9.

At 1425, the UE may maintain, during the connection procedure with the second cell, the data radio bearer. The operations of 1425 may be performed according to the methods described herein. In some examples, aspects of the operations of 1425 may be performed by a radio bearer manager as described with reference to FIGS. 6 through 9.

Figure 15:
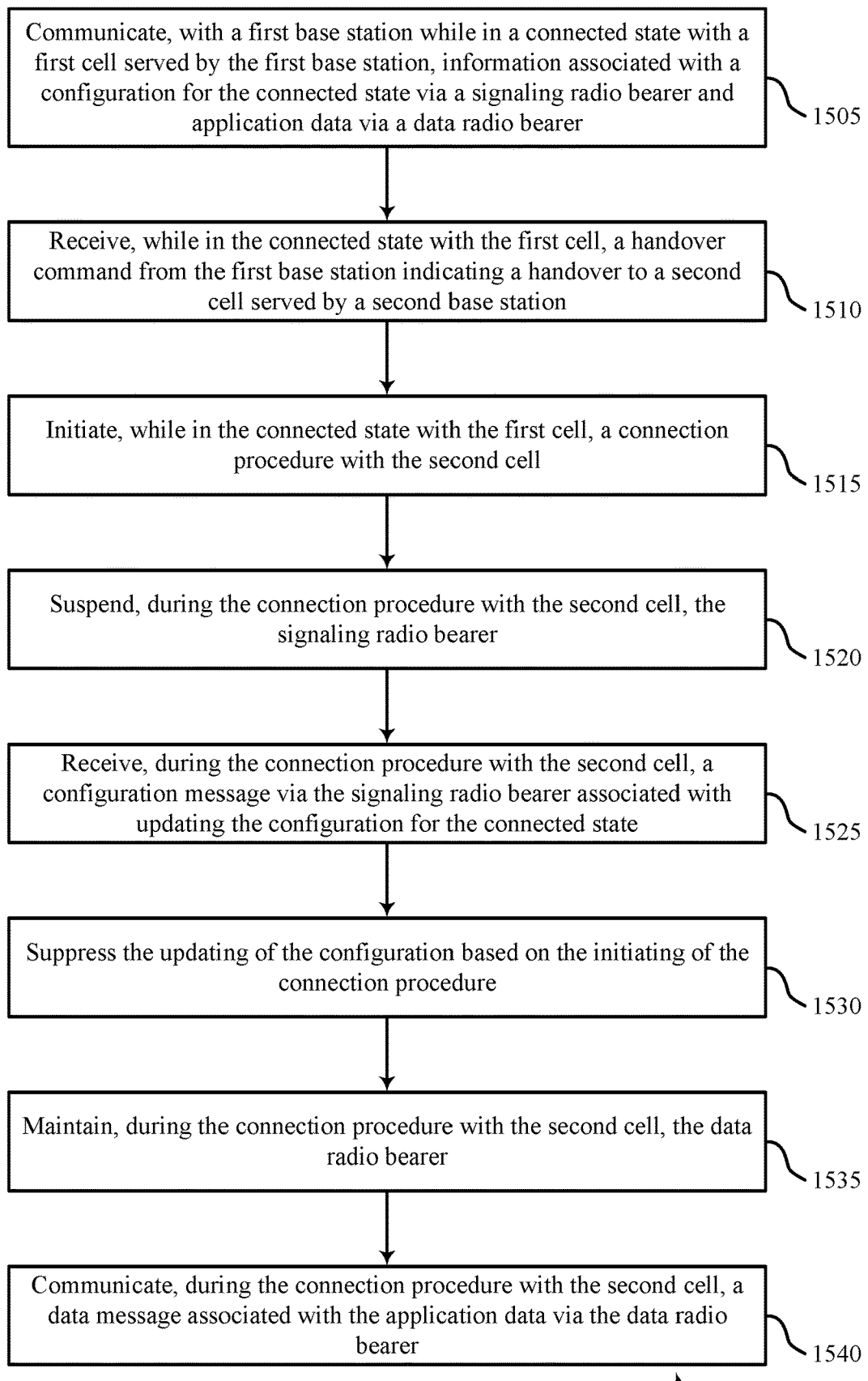

FIG. 15 shows a flowchart illustrating a method 1500 that supports source cell connection handling during make-before-break handover in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein. using special-purpose hardware.

At 1505, the UE may communicate, with a first base station while in a connected state with a first cell served by the first base station, information associated with a configuration for the connected state via a signaling radio bearer and application data via a data radio bearer. The operations of 1505 may be performed according to the methods described herein. In some examples, aspects of the operations of 1505 may be performed by a radio bearer manager as described with reference to FIGS. 6 through 9.

At 1510, the UE may receive, while in the connected state with the first cell, a handover command from the first base station indicating a handover to a second cell served by a second base station. The operations of 1510 may be performed according to the methods described herein. In some examples, aspects of the operations of 1510 may be performed by a handover manager as described with reference to FIGS. 6 through 9.

At 1515, the UE may initiate, while in the connected state with the first cell, a connection procedure with the second cell. The operations of 1515 may be performed according to the methods described herein. In some examples, aspects of the operations of 1515 may be performed by a handover manager as described with reference to FIGS. 6 through 9.

At 1520, the UE may suspend, during the connection procedure with the second cell, the signaling radio bearer. The operations of 1520 may be performed according to the methods described herein. In some examples, aspects of the operations of 1520 may be performed by a radio bearer manager as described with reference to FIGS. 6 through 9.

At 1525, the UE may receive, during the connection procedure with the second cell, a configuration message via the signaling radio bearer associated with updating the configuration for the connected state. The operations of 1525 may be performed according to the methods described herein. In some examples, aspects of the operations of 1525 may be performed by a radio bearer manager as described with reference to FIGS. 6 through 9.

At 1530, the UE may suppress the updating of the configuration based on the initiating of the connection procedure. The operations of 1530 may be performed according to the methods described herein. In some examples, aspects of the operations of 1530 may be performed by a radio bearer manager as described with reference to FIGS. 6 through 9.

At 1535, the UE may maintain, during the connection procedure with the second cell, the data radio bearer. The operations of 1535 may be performed according to the methods described herein. In some examples, aspects of the operations of 1535 may be performed by a radio bearer manager as described with reference to FIGS. 6 through 9.

At 1540, the UE may communicate, during the connection procedure with the second cell, a data message associated with the application data via the data radio bearer. The operations of 1540 may be performed according to the methods described herein. In some examples, aspects of the operations of 1540 may be performed by a radio bearer manager as described with reference to FIGS. 6 through 9.

Figure 16:
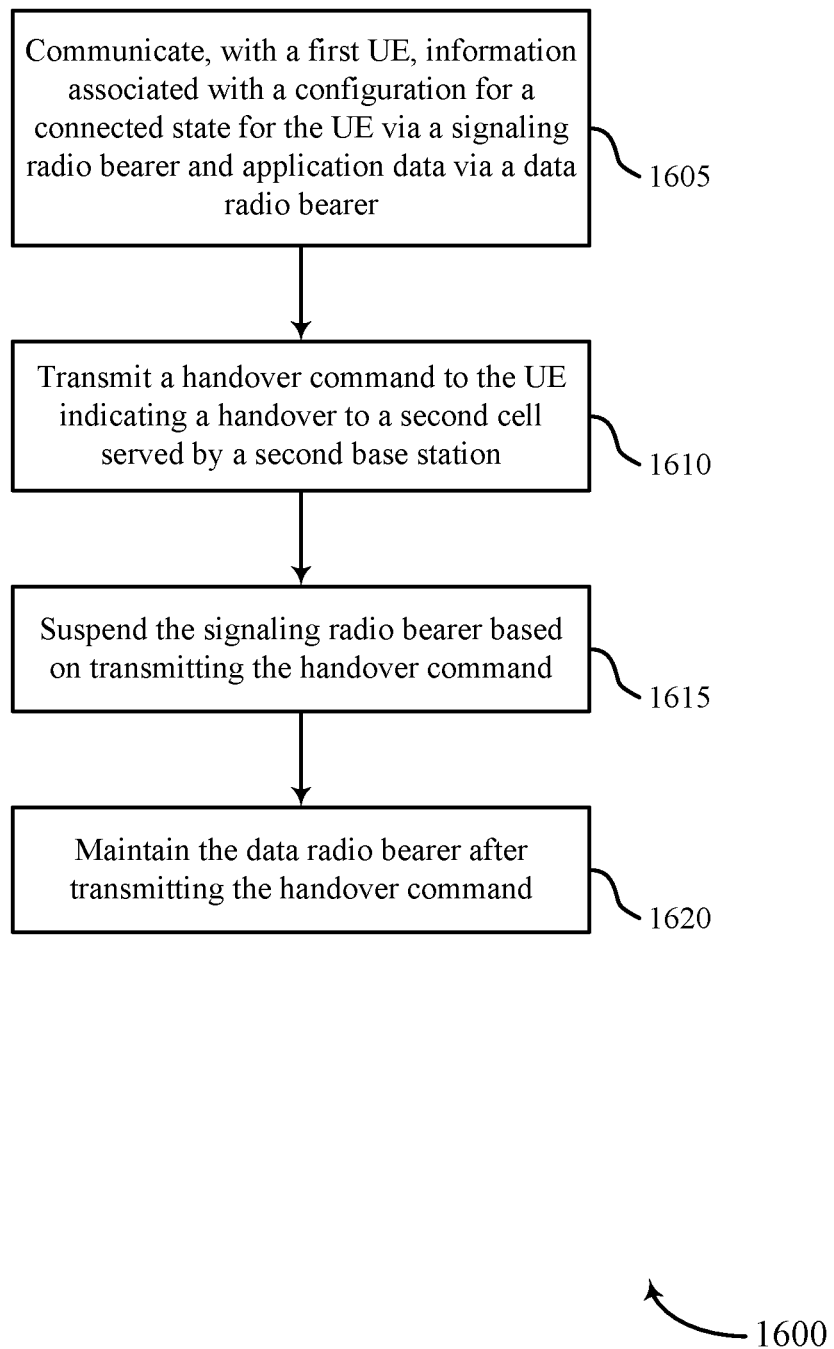

FIG. 16 shows a flowchart illustrating a method 1600 that supports source cell connection handling during make-before-break handover in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may communicate, with a first UE, information associated with a configuration for a connected state for the UE via a signaling radio bearer and application data via a data radio bearer. The operations of 1605 may be performed according to the methods described herein. In some examples, aspects of the operations of 1605 may be performed by a radio bearer manager as described with reference to FIGS. 10 through 13.

At 1610, the base station may transmit a handover command to the UE indicating a handover to a second cell served by a second base station. The operations of 1610 may be performed according to the methods described herein. In some examples, aspects of the operations of 1610 may be performed by a handover manager as described with reference to FIGS. 10 through 13.

At 1615, the base station may suspend the signaling radio bearer based on transmitting the handover command. The operations of 1615 may be performed according to the methods described herein. In some examples, aspects of the operations of 1615 may be performed by a radio bearer manager as described with reference to FIGS. 10 through 13.

At 1620, the base station may maintain the data radio bearer after transmitting the handover command. The operations of 1620 may be performed according to the methods described herein. In some examples, aspects of the operations of 1620 may be performed by a radio bearer manager as described with reference to FIGS. 10 through 13.

Figure 17:
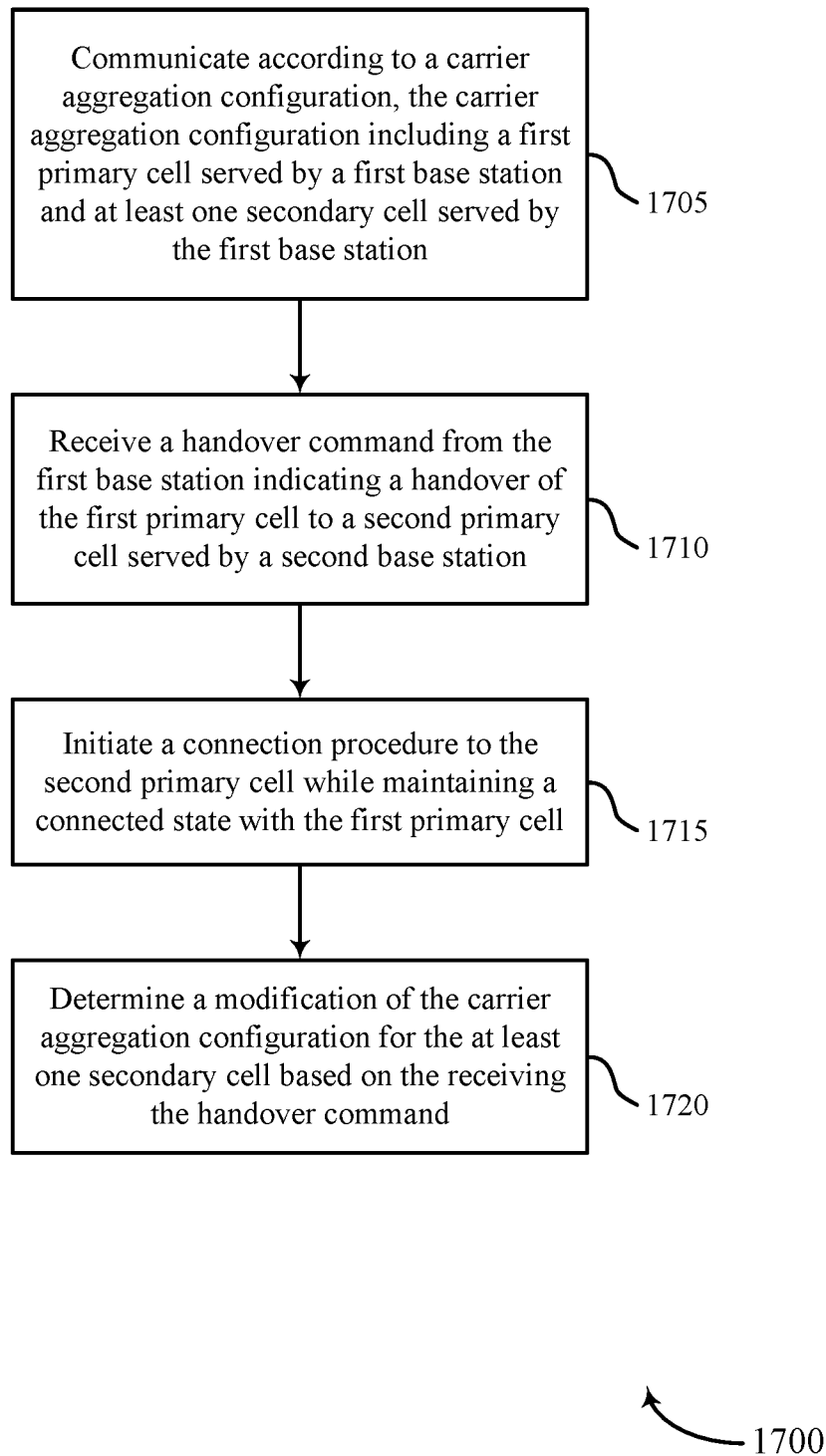

FIG. 17 shows a flowchart illustrating a method 1700 that supports source cell connection handling during make-before-break handover in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1705, the UE may communicate according to a carrier aggregation configuration, the carrier aggregation configuration including a first primary cell served by a first base station and at least one secondary cell served by the first base station. The operations of 1705 may be performed according to the methods described herein. In some examples, aspects of the operations of 1705 may be performed by a carrier aggregation manager as described with reference to FIGS. 6 through 9.

At 1710, the UE may receive a handover command from the first base station indicating a handover of the first primary cell to a second primary cell served by a second base station. The operations of 1710 may be performed according to the methods described herein. In some examples, aspects of the operations of 1710 may be performed by a handover manager as described with reference to FIGS. 6 through 9.

At 1715, the UE may initiate a connection procedure to the second primary cell while maintaining a connected state with the first primary cell. The operations of 1715 may be performed according to the methods described herein. In some examples, aspects of the operations of 1715 may be performed by a handover manager as described with reference to FIGS. 6 through 9.

At 1720, the UE may determine a modification of the carrier aggregation configuration for the at least one secondary cell based on the receiving the handover command. The operations of 1720 may be performed according to the methods described herein. In some examples, aspects of the operations of 1720 may be performed by a carrier aggregation manager as described with reference to FIGS. 6 through 9.

Figure 18:
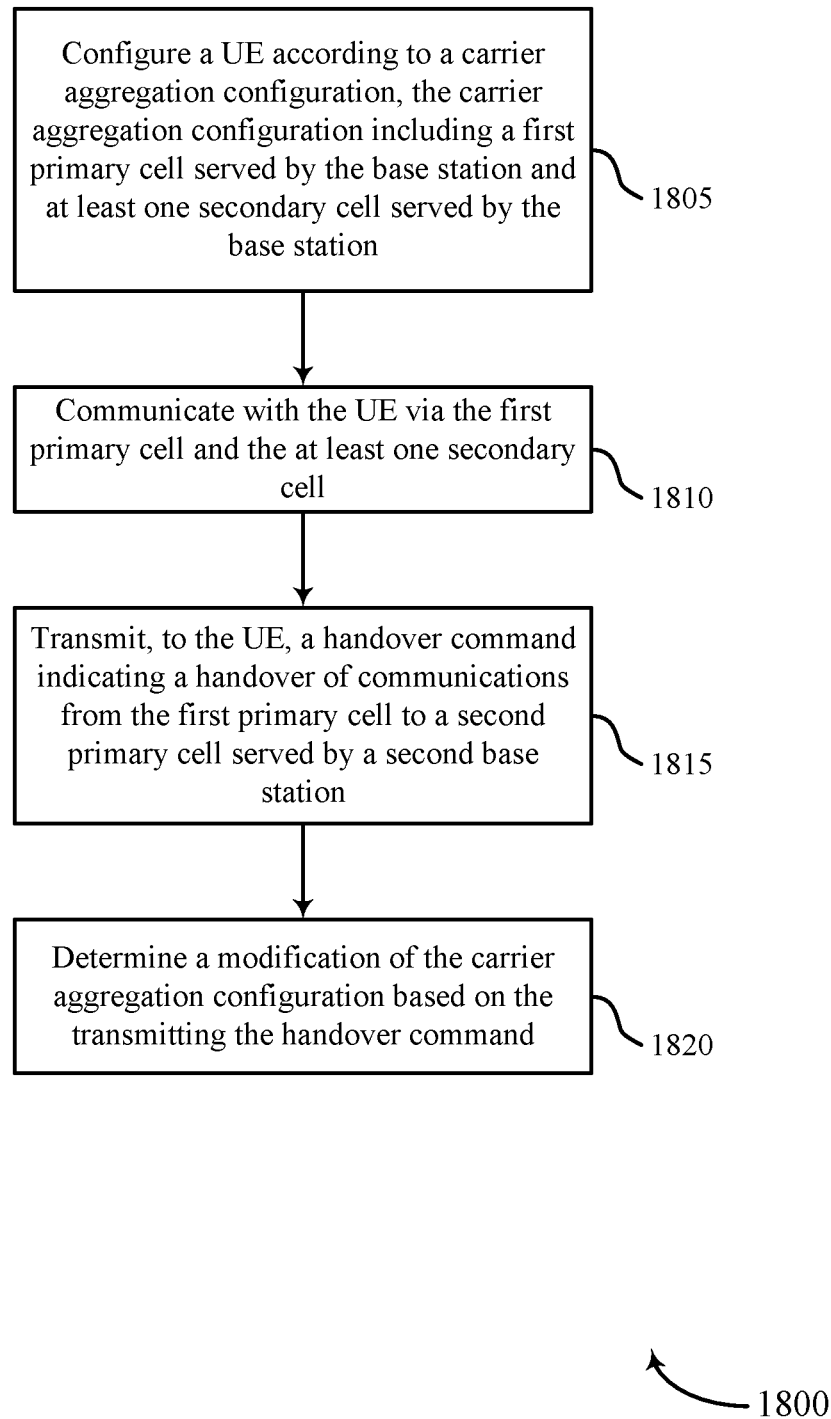

FIG. 18 shows a flowchart illustrating a method 1800 that supports source cell connection handling during make-before-break handover in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may configure a UE according to a carrier aggregation configuration, the carrier aggregation configuration including a first primary cell served by the base station and at least one secondary cell served by the base station. The operations of 1805 may be performed according to the methods described herein. In some examples, aspects of the operations of 1805 may be performed by a carrier aggregation manager as described with reference to FIGS. 10 through 13.

At 1810, the base station may communicate with the UE via the first primary cell and the at least one secondary cell. The operations of 1810 may be performed according to the methods described herein. In some examples, aspects of the operations of 1810 may be performed by a carrier aggregation manager as described with reference to FIGS. 10 through 13.

At 1815, the base station may transmit, to the UE, a handover command indicating a handover of communications from the first primary cell to a second primary cell served by a second base station. The operations of 1815 may be performed according to the methods described herein. In some examples, aspects of the operations of 1815 may be performed by a handover manager as described with reference to FIGS. 10 through 13.

At 1820, the base station may determine a modification of the carrier aggregation configuration based on the transmitting the handover command. The operations of 1820 may be performed according to the methods described herein. In some examples, aspects of the operations of 1820 may be performed by a carrier aggregation manager as described with reference to FIGS. 10 through 13.

Figure 19:
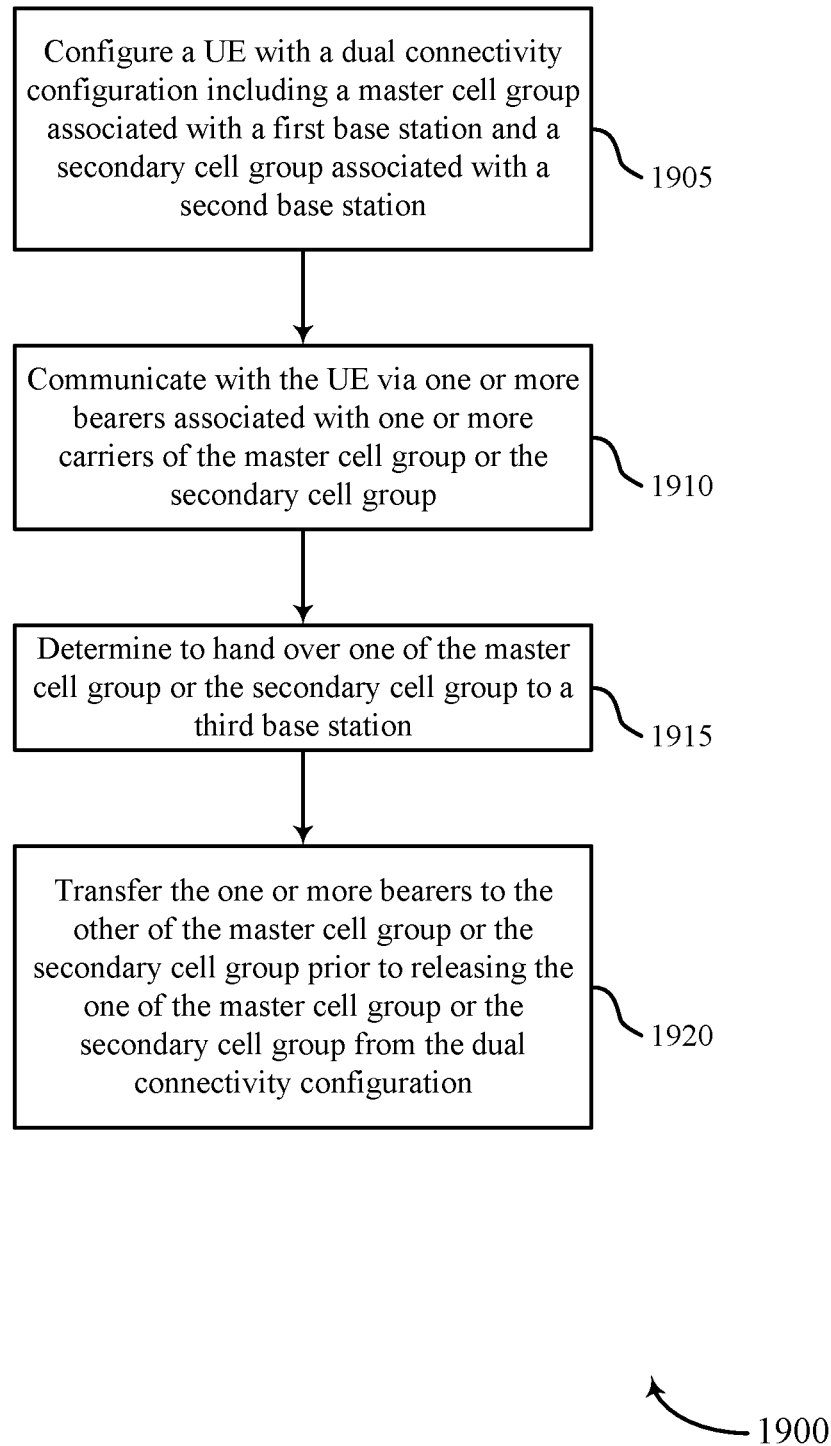

FIG. 19 shows a flowchart illustrating a method 1900 that supports source cell connection handling during make-before-break handover in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1905, the base station may configure a UE with a dual connectivity configuration including a master cell group associated with a first base station and a secondary cell group associated with a second base station. The operations of 1905 may be performed according to the methods described herein. In some examples, aspects of the operations of 1905 may be performed by a dual connectivity manager as described with reference to FIGS. 10 through 13.

At 1910, the base station may communicate with the UE via one or more bearers associated with one or more carriers of the master cell group or the secondary cell group. The operations of 1910 may be performed according to the methods described herein. In some examples, aspects of the operations of 1910 may be performed by a dual connectivity manager as described with reference to FIGS. 10 through 13.

At 1915, the base station may determine to handover one of the master cell group or the secondary cell group to a third base station. The operations of 1915 may be performed according to the methods described herein. In some examples, aspects of the operations of 1915 may be performed by a handover manager as described with reference to FIGS. 10 through 13.

At 1920, the base station may transfer the one or more bearers to the other of the master cell group or the secondary cell group prior to releasing the one of the master cell group or the secondary cell group from the dual connectivity configuration. The operations of 1920 may be performed according to the methods described herein. In some examples, aspects of the operations of 1920 may be performed by a handover manager as described with reference to FIGS. 10 through 13.

Described below are a number of embodiments of methods, systems, or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Embodiment 1: A method for wireless communications at a user equipment (UE), comprising: communicating, with a first base station while in a connected state with a first cell served by the first base station, information associated with a configuration for the connected state via a signaling radio bearer and application data via a data radio bearer; receiving, while in the connected state with the first cell, a handover command from the first base station indicating a handover to a second cell served by a second base station; initiating, while in the connected state with the first cell, a connection procedure with the second cell; suspending, during the connection procedure with the second cell, the signaling radio bearer; and maintaining, during the connection procedure with the second cell, the data radio bearer.

Embodiment 2: The method of embodiment 1, wherein the suspending the signaling radio bearer comprises: receiving, during the connection procedure with the second cell, a configuration message via the signaling radio bearer associated with updating the configuration for the connected state; and suppressing the updating of the configuration based at least in part on the initiating of the connection procedure.

Embodiment 3: The method of embodiments 1 or 2, wherein the maintaining the data radio bearer comprises: communicating, during the connection procedure with the second cell, a data message associated with the application data via the data radio bearer.

Embodiment 4: The method of any of embodiments 1 to 3, further comprising: suspending the data radio bearer based at least in part on determining that the connection procedure with the second cell was successful.

Embodiment 5: The method of embodiment 4, further comprising: receiving an indication from the second cell to release the data radio bearer; and releasing the data radio bearer based at least in part on the indication.

Embodiment 6: The method of embodiment 4, further comprising: establishing, over the second cell, a second data radio bearer for communicating the application data with the second base station.

Embodiment 7: The method of embodiment 4, further comprising: resuming the data radio bearer based at least in part on determining that the connection procedure was unsuccessful or a radio link failure occurred for the second cell.

Embodiment 8: The method of any of embodiments 1 to 7, further comprising: receiving an indication from the second cell to release the signaling radio bearer; and releasing the signaling radio bearer based at least in part on the indication.

Embodiment 9: The method of any of embodiments 1 to 8, wherein the handover command comprises a condition for initiating the connection procedure with the second cell, and wherein the suspending the signaling radio bearer is based at least in part on determining that the condition for initiating the connection procedure is satisfied.

Embodiment 10: The method of any of embodiments 1 to 9, further comprising: resuming the signal radio bearer based at least in part on determining that the connection procedure was unsuccessful or a radio link failure occurred for the second cell.

Embodiment 11: The method of any of embodiments 1 to 10, further comprising: suspending monitoring for at least one paging message based at least in part on receiving the handover command.

Embodiment 12: The method of any of embodiments 1 to 11, further comprising: continuing a radio link monitoring procedure, a beam failure recovery procedure or a combination thereof on the first cell during the connection procedure with the second cell.

Embodiment 13: The method of any of embodiments 1 to 12, further comprising: determining that a radio link failure has occurred on the first cell during the connection procedure with the second cell; and suspending a connection re-establishment procedure.

Embodiment 14: The method of any of embodiments 1 to 13, further comprising: suspending, during the connection procedure with the second cell, a radio resource management procedure for the first cell.

Embodiment 15: The method of embodiment 14, wherein the suspending the radio resource management procedure comprises: suspending measurements for a measurement gap for the first cell, releasing the measurement gap for the first cell, suppressing monitoring for one or more radio resource management events, or a combination thereof.

Embodiment 16: A method for wireless communications at a base station, comprising: communicating, with a first user equipment (UE), information associated with a configuration for a connected state for the UE via a signaling radio bearer and application data via a data radio bearer; transmitting a handover command to the UE indicating a handover to a second cell served by a second base station; suspending the signaling radio bearer based at least in part on transmitting the handover command; and maintaining the data radio bearer after transmitting the handover command.

Embodiment 17: The method of embodiment 16, wherein the suspending the signaling radio bearer comprises suppressing one or more configuration messages associated with updating the configuration for the connected state for the UE.

Embodiment 18: The method of any one of embodiments 16 or 17, wherein the maintaining the data radio bearer comprises: communicating, to the UE, a data message associated with the application data via the data radio bearer after transmitting the handover command.

Embodiment 19: The method of any one of embodiments 16 to 18, further comprising: receiving an indication that a connection procedure between the UE and the second cell was successful; and transmitting a release message to the UE to release the data radio bearer.

Embodiment 20: The method of any one of embodiments 16 to 19, further comprising: receiving an indication that a connection procedure between the UE and the second cell was successful; suspending the data radio bearer based at least in part on receiving the indication; and resuming the data radio bearer based at least in part on determining that a radio link failure occurred between the UE and the second cell.

Embodiment 21: The method of any one of embodiments 16 to 20, further comprising: receiving an indication that a connection procedure between the UE and the second cell was successful; and transmitting a release message to the UE to release the signaling radio bearer based at least in part on receiving the indication.

Embodiment 22: The method of any one of embodiments 16 to 21, wherein the handover command comprises a condition for initiating a connection procedure with the second cell.

Embodiment 23: The method of any one of embodiments 16 to 22, further comprising: resuming the signaling radio bearer based at least in part on receiving an indication that a connection procedure between the UE and the second cell was unsuccessful or a radio link failure occurred between the UE and the second cell.

Embodiment 24: The method of any one of embodiments 16 to 23, further comprising: suspending sending at least one paging message based at least in part on transmitting the handover command.

Embodiment 25: A method for wireless communications at a user equipment (UE), comprising: communicating according to a carrier aggregation configuration, the carrier aggregation configuration comprising a first primary cell served by a first base station and at least one secondary cell served by the first base station; receiving a handover command from the first base station indicating a handover of the first primary cell to a second primary cell served by a second base station; initiating a connection procedure to the second primary cell while maintaining a connected state with the first primary cell; and determining a modification of the carrier aggregation configuration for the at least one secondary cell based at least in part on the receiving the handover command.

Embodiment 26: The method of embodiment 25, wherein the modification comprises: releasing the at least one secondary cell served by the first base station from the carrier aggregation configuration.

Embodiment 27: The method of embodiment 25, wherein the modification comprises: deactivating the at least one secondary cell based at least in part on receiving the handover command from the first base station.

Embodiment 28: The method of embodiment 27, wherein the deactivating the at least one secondary cell comprises suspending a radio resource monitoring procedure for the at least one secondary cell.

Embodiment 29: The method of embodiment 25, wherein the modification comprises: maintaining the at least one secondary cell in an activated state during a handover procedure with the second base station.

Embodiment 30: A method for wireless communications at a base station, comprising: configuring a user equipment (UE) according to a carrier aggregation configuration, the carrier aggregation configuration comprising a first primary cell served by the base station and at least one secondary cell served by the base station; communicating with the UE via the first primary cell and the at least one secondary cell; transmitting, to the UE, a handover command indicating a handover of communications from the first primary cell to a second primary cell served by a second base station; and determining a modification of the carrier aggregation configuration based at least in part on the transmitting the handover command.

Embodiment 31: The method of embodiment 30, wherein the modification comprises: releasing the at least one secondary cell from the carrier aggregation configuration.

Embodiment 32: The method of embodiment 30, wherein the modification comprises: deactivating the at least one secondary cell for the carrier aggregation configuration.

Embodiment 33: The method of embodiment 30, wherein the modification comprises: maintaining, for the carrier aggregation configuration, the at least one secondary cell in an activated state.

Embodiment 34: The method of embodiment 33, further comprising: receiving one or more capabilities of the UE, wherein the maintaining the at least one secondary cell in an activated state is based at least in part on the one or more capabilities of the UE.

Embodiment 35: The method of any one of embodiments 30 to 34, further comprising: communicating, with the second base station, at least one message for determining the carrier aggregation configuration.

Embodiment 36: A method for wireless communications, comprising: configuring a user equipment (UE) with a dual connectivity configuration comprising a master cell group associated with a first base station and a secondary cell group associated with a second base station; communicating with the UE via one or more bearers associated with one or more carriers of the master cell group or the secondary cell group; determining to handover one of the master cell group or the secondary cell group to a third base station; and transferring the one or more bearers to the other of the master cell group or the secondary cell group prior to releasing the one of the master cell group or the secondary cell group from the dual connectivity configuration.

Embodiment 37: The method of embodiment 36, wherein the dual connectivity configuration comprises a first primary cell and a first set of secondary cells served by the first base station, and a second primary cell and a second set of secondary cells served by the second base station, the method further comprising: releasing the first set of secondary cells or the second set of secondary cells based at least in part on determining to handover the master cell group or the secondary cell group.

Embodiment 38: The method of any one of embodiments 36 or 37, further comprising: determining to handover the other of the master cell group or the secondary cell group to a fourth base station; and transferring one or more additional bearers from the other of the master cell group or the secondary cell group to a cell group served by the third base station prior to releasing the other of the master cell group or the secondary cell group from the dual connectivity configuration.

Embodiment 39: An apparatus for wireless communication comprising means configured to carry out all steps of the method of any one of embodiments 1 to 15, 16 to 24, 25 to 29, 30 to 35, or 36 to 38.

Embodiment 40: The apparatus of example 40, wherein the means comprise a processor, memory in an electronic communication with the processor, and instructions stored in the memory and executable by the processor.

Embodiment 41: A computer program comprising program instructions which are computer-executable to implement all steps of the method of any one of embodiments 1 to 15, 16 to 24, 25 to 29, 30 to 35, or 36 to 38.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
communicating, with a first base station while in a connected state with a first cell served by the first base station, information associated with a configuration for the connected state via a signaling radio bearer and application data via a data radio bearer;
receiving, while in the connected state with the first cell, a handover command from the first base station indicating a handover to a second cell served by a second base station;
initiating, while in the connected state with the first cell, a connection procedure with the second cell;
suspending, during the connection procedure with the second cell, the signaling radio bearer, wherein the suspending comprises receiving a configuration message via the signaling radio bearer associated with updating the configuration for the connected state and suppressing the updating of the configuration based at least in part on the initiating; and
maintaining, during the connection procedure with the second cell, the data radio bearer.

2. The method of claim 1, wherein the maintaining the data radio bearer comprises:
communicating, during the connection procedure with the second cell, a data message associated with the application data via the data radio bearer.

3. The method of claim 1, further comprising:
suspending the data radio bearer based at least in part on determining that the connection procedure with the second cell was successful.

4. The method of claim 3, wherein the data radio bearer comprises an uplink radio bearer, and further comprising:
maintaining a downlink data radio bearer with the first cell after suspending the uplink data radio bearer;
receiving an indication from the second cell to release the downlink radio bearer after suspending the uplink data radio bearer; and
releasing the downlink data radio bearer based at least in part on the indication.

5. The method of claim 3, further comprising:
receiving an indication from the second cell to release the connection with the first cell; and
releasing the data radio bearer and the signaling radio bearer based at least in part on the indication.

6. The method of claim 3, further comprising:
establishing, over the second cell, a second data radio bearer for communicating the application data with the second base station.

7. The method of claim 3, further comprising:
resuming the source cell connection, data radio bearer, and signaling radio bearer based at least in part on determining that the connection procedure was unsuccessful or a radio link failure occurred for the second cell.

8. The method of claim 1, wherein the handover command comprises a condition for initiating the connection procedure with the second cell, and wherein the suspending the signaling radio bearer is based at least in part on determining that the condition for initiating the connection procedure is satisfied.

9. The method of claim 1, further comprising:
suspending monitoring for at least one short message or paging message based at least in part on receiving the handover command; and
suspending, during the connection procedure with the second cell, a radio resource management procedure for the first cell.

10. The method of claim 1, further comprising:
continuing a radio link monitoring procedure, a beam failure recovery procedure, or a combination thereof on the first cell during the connection procedure with the second cell.

11. The method of claim 1, further comprising:
determining that a radio link failure has occurred on the first cell during the connection procedure with the second cell; and
suspending a connection re-establishment procedure.

12. The method of claim 1, further comprising:
performing a radio resource control (RRC) reestablishment procedure upon determining that a radio link failure has occurred on the first cell and the connection procedure was unsuccessful for the second cell.

13. The method of claim 12, wherein the suspending the radio resource management procedure comprises:
suspending measurements for a measurement gap for the first cell, releasing the measurement gap for the first cell, suppressing monitoring for one or more radio resource management events, or a combination thereof.

14. A method for wireless communications at a user equipment (UE), comprising:
communicating according to a carrier aggregation configuration, the carrier aggregation configuration comprising a first primary cell served by a first base station and at least one secondary cell served by the first base station;
receiving a handover command from the first base station indicating a handover of the first primary cell to a second primary cell served by a second base station;
initiating, by the UE, a connection procedure to the second primary cell while maintaining a connected state with the first primary cell; and
determining a modification of the carrier aggregation configuration for the at least one secondary cell based at least in part on the receiving the handover command.

15. The method of claim 14, wherein the modification comprises:
releasing the at least one secondary cell served by the first base station from the carrier aggregation configuration.

16. The method of claim 14, wherein the modification comprises:
deactivating the at least one secondary cell based at least in part on receiving the handover command from the first base station.

17. The method of claim 16, wherein the deactivating the at least one secondary cell comprises suspending a radio resource monitoring procedure for the at least one secondary cell.

18. The method of claim 14, wherein the modification comprises:
maintaining the at least one secondary cell in an activated state during a handover procedure with the second base station.

19. An apparatus for wireless communications at a user equipment (UE), comprising:
a processor,
memory coupled with the processor; and
instructions stored in the memory and executable by the processor to cause the apparatus to:
communicate, with a first base station while in a connected state with a first cell served by the first base station, information associated with a configuration for the connected state via a signaling radio bearer and application data via a data radio bearer;
receive, while in the connected state with the first cell, a handover command from the first base station indicating a handover to a second cell served by a second base station;
initiate, while in the connected state with the first cell, a connection procedure with the second cell;
suspend, during the connection procedure with the second cell, the signaling radio bearer
maintain, during the connection procedure with the second cell, the data radio bearer.

20. The apparatus of claim 19, wherein the instructions stored in the memory for maintaining the data radio bearer are further executable by the processor to cause the apparatus to:
communicate, during the connection procedure with the second cell, a data message associated with the application data via the data radio bearer.

21. The apparatus of claim 19, wherein the instructions are further executable by the processor to cause the apparatus to:
suspend the data radio bearer based at least in part on determining that the connection procedure with the second cell was successful.

22. The apparatus of claim 21, wherein the instructions are further executable by the processor to cause the apparatus to:

receive an indication from the second cell to release the connection with the first cell; and release the data radio bearer and the signaling radio bearer based at least in part on the indication.

23. The apparatus of claim 21, wherein the instructions are further executable by the processor to cause the apparatus to:

establish, over the second cell, a second data radio bearer for communicating the application data with the second base station.

24. The apparatus of claim 21, wherein the instructions are further executable by the processor to cause the apparatus to:

resume the source cell connection, data radio bearer, and signaling radio bearer based at least in part on determining that the connection procedure was unsuccessful or a radio link failure occurred for the second cell.

25. An apparatus for wireless communications at a user equipment (UE), comprising:

a processor, memory coupled with the processor; and instructions stored in the memory and executable by the processor to cause the apparatus to:

communicate according to a carrier aggregation configuration, the carrier aggregation configuration comprising a first primary cell served by a first base station and at least one secondary cell served by the first base station;

receive a handover command from the first base station indicating a handover of the first primary cell to a second primary cell served by a second base station;

initiate determine a modification of the carrier aggregation configuration for the at least one secondary cell based at least in part on the receiving the handover command.

26. The apparatus of claim 25, wherein the instructions stored in the memory for determining the modification are further executable by the processor to cause the apparatus to:

release the at least one secondary cell served by the first base station from the carrier aggregation configuration.

27. The apparatus of claim 25, wherein the instructions stored in the memory for determining the modification are further executable by the processor to cause the apparatus to:

deactivate the at least one secondary cell based at least in part on receiving the handover command from the first base station.

28. The apparatus of claim 27, wherein the instructions stored in the memory for deactivating the at least one secondary cell are further executable by the processor to cause the apparatus to:

suspend a radio resource monitoring procedure for the at least one secondary cell.

* * * * *

UNITED STATES PATENT AND TRADEMARK OFFICE
CERTIFICATE OF CORRECTION

PATENT NO. : 11,071,026 B2
APPLICATION NO. : 16/803809
DATED : July 20, 2021
INVENTOR(S) : Paladugu et al.

It is certified that error appears in the above-identified patent and that said Letters Patent is hereby corrected as shown below:

In the Claims

Claim 19, Column 52, Line 49 Should read:
"the signaling radio bearer, wherein the suspending comprises receiving a configuration message via the signaling radio bearer associated with updating the configuration for the connected state and suppressing the updating of the configuration based at least in part on the initiating; and"

Claim 25, Column 54, Line 4 Should read:
"initiate, by the UE, a connection procedure to the second primary cell while maintaining a connected state with the first primary cell; and"

Signed and Sealed this
Fifth Day of October, 2021

Drew Hirshfeld
*Performing the Functions and Duties of the
Under Secretary of Commerce for Intellectual Property and
Director of the United States Patent and Trademark Office*